(12) United States Patent
Ono et al.

(10) Patent No.: US 11,293,109 B2
(45) Date of Patent: Apr. 5, 2022

(54) CARBON DIOXIDE ELECTROLYTIC DEVICE

(71) Applicant: KABUSHIKI KAISHA TOSHIBA, Tokyo (JP)

(72) Inventors: Akihiko Ono, Kita (JP); Yuki Kudo, Yokohama (JP); Yusuke Kofuji, Yokohama (JP); Asahi Motoshige, Oto (JP); Ryota Kitagawa, Setagaya (JP); Masakazu Yamagiwa, Yokohama (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 35 days.

(21) Appl. No.: 17/017,427

(22) Filed: Sep. 10, 2020

(65) Prior Publication Data

US 2021/0292926 A1 Sep. 23, 2021

(30) Foreign Application Priority Data

Mar. 23, 2020 (JP) .............................. JP2020-050561

(51) Int. Cl.
*C25B 15/08* (2006.01)
*C25B 1/04* (2021.01)
(Continued)

(52) U.S. Cl.
CPC ................ *C25B 15/08* (2013.01); *C25B 1/04* (2013.01); *C25B 3/25* (2021.01); *C25B 3/26* (2021.01); *C25B 9/19* (2021.01); *C25B 9/73* (2021.01)

(58) Field of Classification Search
CPC ..................................... C25B 3/25; C25B 3/26
See application file for complete search history.

(56) References Cited

U.S. PATENT DOCUMENTS 10,208,385 B2 2/2019 Kudo et al.
10,981,848 B2 * 4/2021 Ono .................... G01N 27/302
(Continued)

FOREIGN PATENT DOCUMENTS

DE 102016211155 A1 * 12/2017 ............... C25B 3/25
JP 2018-150595 A 9/2018
JP 2018-154901 A 10/2018

OTHER PUBLICATIONS

Zengcai Liu, et al., "Electrochemical generation of syngas from water to carbon dioxide at industrially important rates", Journal of $CO_2$ Utilization, 15, 2016, pp. 50-56.
(Continued)

*Primary Examiner* — Harry D Wilkins, III
(74) *Attorney, Agent, or Firm* — Oblon, McClelland, Maier & Neustadt, L.L.P.

(57) ABSTRACT

A carbon dioxide electrolytic device in an embodiment includes: an electrolysis cell including a cathode including a $CO_2$ gas supply flow path, an anode, and a separator; a $CO_2$ supply unit configured to supply $CO_2$ gas to the gas supply flow path; and a rinse material supply unit configured to make a rinse material containing $H_2O$ flow through the $CO_2$ gas supply flow path. The $CO_2$ gas supply flow path includes a first opening provided on one end side, a second opening provided on another end side, and a third opening provided between the first opening and the second opening. The rinse material supply unit is configured to make the rinse material flow at least between the first opening and the third opening of the $CO_2$ gas supply flow path.

16 Claims, 12 Drawing Sheets

(51) Int. Cl.
    *C25B 3/25*     (2021.01)
    *C25B 9/19*     (2021.01)
    *C25B 9/73*     (2021.01)
    *C25B 3/26*     (2021.01)

(56) References Cited

U.S. PATENT DOCUMENTS

| | | | |
|---|---|---|---|
| 2016/0108530 A1* | 4/2016 | Masel | H01M 8/1025 204/265 |
| 2018/0265440 A1 | 9/2018 | Kudo et al. | |
| 2018/0274109 A1* | 9/2018 | Kudo | C25B 15/08 |
| 2019/0085477 A1* | 3/2019 | Ono | C25B 3/25 |
| 2020/0002822 A1* | 1/2020 | Ono | C25B 9/73 |
| 2020/0087233 A1* | 3/2020 | Ono | C25B 15/029 |

OTHER PUBLICATIONS

Sinchao Ma, et al., "Efficient Electrochemical Flow System with Improved Anode for the Conversion of $CO_2$ to CO", Journal of The Electrochemical Society, 161 (10), 2014, pp. F1124-F1131.

* cited by examiner

CARBON DIOXIDE ELECTROLYTIC DEVICE

CROSS-REFERENCE TO RELATED APPLICATION

This application is based upon and claims the benefit of priority from Japanese Patent Application No. 2020-050561, filed on Mar. 23, 2020; the entire contents of which are incorporated herein by reference.

FIELD

Embodiments described herein relate generally to a carbon dioxide electrolytic device.

BACKGROUND

In recent years, depletion of fossil fuel such as petroleum or coal has been concerned, and expectation for sustainably-usable renewable energy has been rising. Examples of the renewable energy include those by a solar cell, wind power generation, and the like. Because the power generation amount of them depends on weather and natural situations, there is a problem that it is difficult to stably supply electric power. Hence, there has been made an attempt to store the electric power generated by the renewable energy in a storage battery, to thereby stabilize the electric power. However, when the electric power is stored, there are problems that a cost is required for the storage battery and a loss occurs at the time of the storage.

For the above points, attention is focused on a technology in which the electric power generated by the renewable energy is used to electrochemically reduce and convert, for example, carbon dioxide ($CO_2$) into a chemical substance (chemical energy) such as a carbon compound such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), or ethylene ($C_2H_4$). As a $CO_2$ electrolytic device, for example, a structure is being studied in which $CO_2$ gas is brought into contact with a cathode having a gas diffusion layer, a catalyst layer and so on, and an anode solution is brought into contact with an anode. An example of the concrete configuration of the electrolytic device is a configuration which includes a cathode, a $CO_2$ gas flow path disposed along the cathode, an anode, an anode solution flow path disposed along the anode, and a separator disposed between the $CO_2$ gas flow path and the anode solution flow path.

When the reaction of producing, for example, CO from $CO_2$ is performed for a long time by using the electrolytic device having the above configuration, there is a problem that deterioration of cell outputs such as a reduction in production amount of CO and an increase in cell voltage occurs over time. Its conceivable reason is precipitation of salt in the $CO_2$ gas flow path. Hence, it is proposed that a rinse solution such as water is introduced into the $CO_2$ gas flow path accompanying passage of the electrolysis time to dissolve the salt in the flow path, thereby performing refresh. However, the introduction of the rinse solution to the $CO_2$ gas flow path possibly causes infiltration of the rinse solution to the gas diffusion layer, the catalyst layer or the like constituting the cathode. This phenomenon is called flooding herein. The flooding becomes an occurrence factor of disturbing the supply of $CO_2$ required for the reaction to the catalyst or decreasing the reaction efficiency. It is required to suppress the occurrence of the flooding in addition to obtaining the effect of removing the salt precipitated in the $CO_2$ gas flow path.

DETAILED DESCRIPTION

Figure 1:
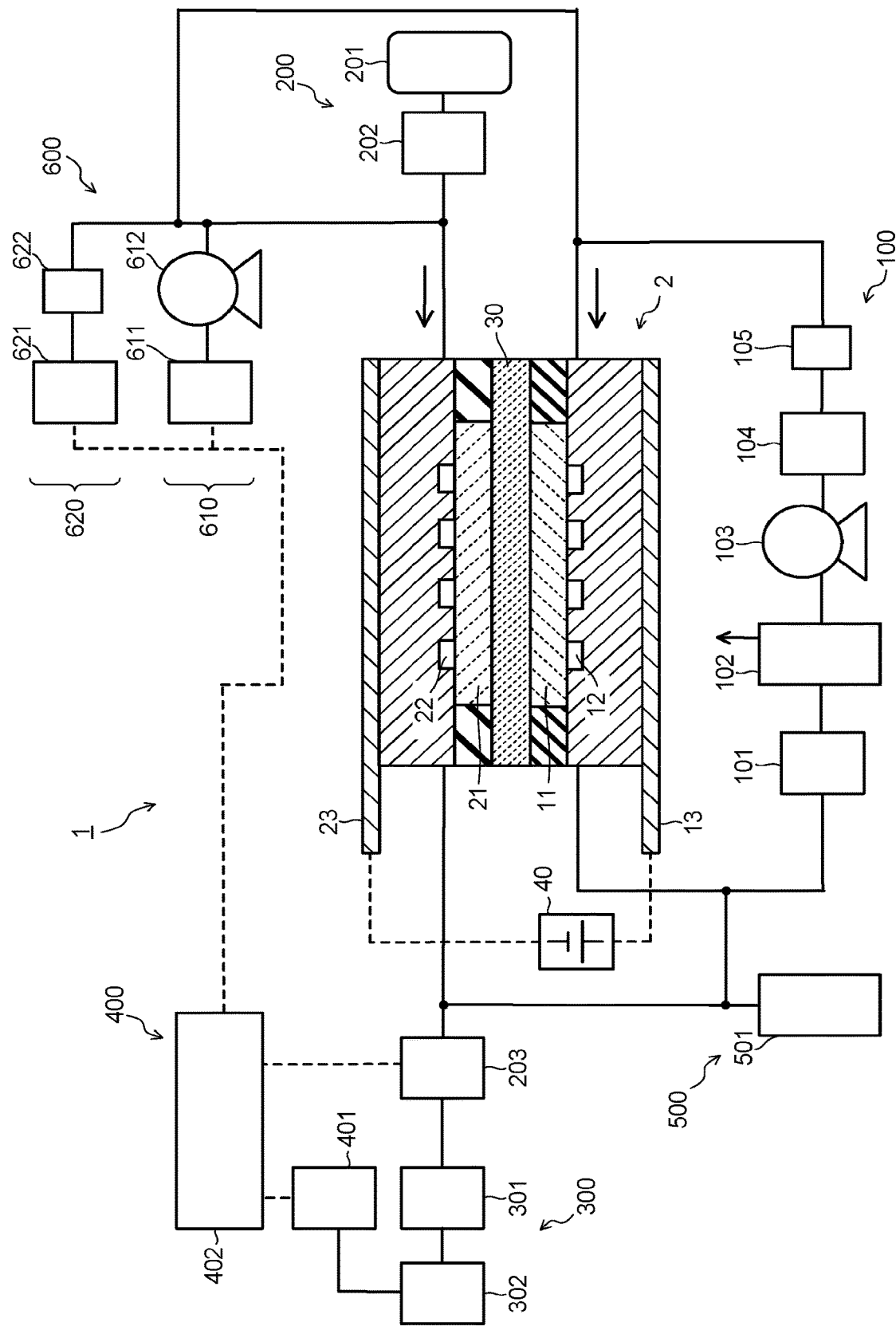
FIG. 1 is a view illustrating a carbon dioxide electrolytic device in a first embodiment.

A carbon dioxide electrolytic device in an embodiment includes: an electrolysis cell comprising a cathode configured to reduce carbon dioxide to produce a carbon compound, an anode configured to oxidize water to produce oxygen, a gas supply flow path configured to supply carbon dioxide to the cathode and comprising at least a first opening provided on one end side, a second opening provided on another end side, and a third opening provided between the first opening and the second opening, a solution supply flow path configured to supply an electrolytic solution containing water to the anode, and a separator configured to separate the anode from the cathode; a carbon dioxide supply unit configured to supply the carbon dioxide between the first opening and the second opening of the gas supply flow path; an electrolytic solution supply unit configured to supply the electrolytic solution to the solution supply flow path; and a rinse material supply unit configured to supply a rinse material containing $H_2O$ so as to make the rinse material flow at least between the first opening and the third opening of the gas supply flow path.

Hereinafter, a carbon dioxide electrolytic device in an embodiment will be described referring to the drawings. In each embodiment presented below, substantially the same components are denoted by the same codes, and a description thereof is sometimes partially omitted. The drawings are schematic, and a relationship between a thickness and a planar size, thickness proportions of the respective portions, and the like are sometimes different from actual ones.

First Embodiment

Figure 2:
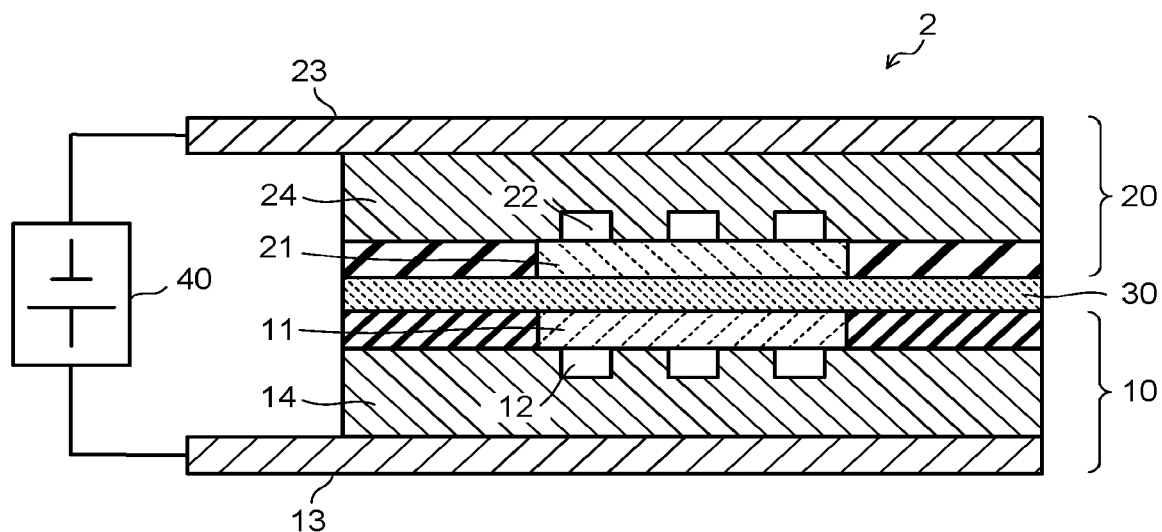
FIG. 2 is a sectional view illustrating an electrolysis cell of the carbon dioxide electrolytic device illustrated in FIG. 1.

FIG. 1 is a view illustrating a carbon dioxide electrolytic device according to an embodiment, and FIG. 2 is a sectional view illustrating an electrolysis cell in the electrolytic device illustrated in FIG. 1. A carbon dioxide electrolytic device 1 illustrated in FIG. 1 includes an electrolysis cell 2, an anode solution supply system 100 which supplies an anode solution to the electrolysis cell 2, a gas supply system 200 which supplies carbon dioxide ($CO_2$) gas to the electrolysis cell 2, a product collection system 300 which collects a product produced by a reduction reaction in the electrolysis cell 2, a control system 400 which detects a type and a production amount of the collected product, and performs control of the product and control of a refresh operation, a waste solution collection system 500 which collects a waste solution of the cathode solution and the anode solution, and a refresh material supply system 600 which restores an anode, a cathode, and the like of the electrolysis cell 2.

As illustrated in FIG. 2, the electrolysis cell 2 includes an anode part 10, a cathode part 20, and a separator 30. The anode part 10 includes an anode 11, an anode solution flow path 12, and an anode current collector 13. The cathode part 20 includes a cathode 21, a $CO_2$ gas flow path 22, and a cathode current collector 23. The separator 30 is disposed to separate the anode part 10 from the cathode part 20. The electrolysis cell 2 is sandwiched between a pair of not-illustrated support plates, and further tightened by bolts or the like. In FIG. 1 and FIG. 2, a code 40 denotes a power supply which passes a current through the anode 11 and the cathode 21. The power supply 40 is electrically connected to the anode 11 and the cathode 21 via a current introduction member. The power supply 40 is not limited to a normal system power supply, battery, or the like, but may be a power source which supplies electric power generated by renewable energy by a solar cell, wind power generation, geothermal power generation or the like.

The anode 11 is an electrode (oxidation electrode) which causes an oxidation reaction of water ($H_2O$) in the anode solution as an electrolytic solution to produce oxygen ($O_2$). The anode 11 has a first surface in contact with the separator 30, and a second surface facing the anode solution flow path 12. The first surface of the anode 11 is in close contact with the separator 30. The anode solution flow path 12 supplies the anode solution to the anode 11, and is formed of a pit (groove portion/recessed portion) provided in a first flow path plate 14. The anode solution flows through the inside of the anode solution flow path 12 in a manner to be in contact with the anode 11. The anode current collector 13 is in electrical contact with a surface on a side opposite to the anode 11 of the first flow path plate 14 which forms the anode solution flow path 12.

The first flow path plate 14 is provided with not-illustrated solution introduction port and solution discharge port, and the anode solution is introduced and discharged by the anode solution supply system 100 via these solution introduction port and solution discharge port. It is preferable to use, for the first flow path plate 14, a material having low chemical reactivity and high conductivity. Examples of the material include metal materials such as Ti and SUS, carbon materials, and the like. It is preferable that a plurality of lands (projections) are provided in the anode solution flow path 12. The lands are provided for mechanical retention and electrical continuity. The lands are provided for mechanical retention and electrical continuity. The lands are preferably provided in an alternate manner for uniformizing the flow of the anode solution. Due to the above lands, the anode solution flow path 12 meanders. In addition, also for successfully discharging the anode solution containing oxygen ($O_2$) gas mixed therein, it is preferable to provide the lands in an alternate manner in the anode solution flow path 12 to make the anode solution flow path 12 meander.

It is preferable that the anode 11 is mainly constituted of a catalyst material (anode catalyst material) capable of oxidizing water ($H_2O$) to produce oxygen or hydrogen ions and capable of reducing an overvoltage in such a reaction. Examples of the anode catalyst material include metals such as platinum (Pt), palladium (Pd), and nickel (Ni), alloys and intermetallic compounds containing the above metals, binary metal oxides such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), and a lanthanum oxide (La—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, and metal complexes such as a Ru complex and a Fe complex.

The anode 11 includes a base material having a structure capable of making the anode solution and ions move between the separator 30 and the anode solution flow path 12, for example, a porous structure such as a mesh material, a punching material, a porous body, or a metal fiber sintered body. The base material may be constituted of a metal such as titanium (Ti), nickel (Ni), or iron (Fe), or a metal material such as an alloy (for example, SUS) containing at least one of these metals, or may be constituted of the above-described anode catalyst material. When an oxide is used as the anode catalyst material, it is preferable to form a catalyst layer by attaching or stacking the anode catalyst material on a surface of the base material made of the above-described metal material. The anode catalyst material may have nanoparticles, a nanostructure, a nanowire, or the like for the purpose of increasing the oxidation reaction. The nanostructure is a structure in which nanoscale irregularities are formed on a surface of the catalyst material.

The cathode 21 is an electrode (reduction electrode) which causes a reduction reaction of carbon dioxide ($CO_2$) to produce a carbon compound such as carbon monoxide (CO), methane ($CH_4$), ethane ($C_2H_6$), ethylene ($C_2H_4$), methanol ($CH_3OH$), ethanol ($C_2H_5OH$), or ethylene glycol ($C_2H_6O_2$). In the cathode 21, a side reaction in which hydrogen ($H_2$) is produced by a reduction reaction of water ($H_2O$) is caused simultaneously with the reduction reaction of carbon dioxide ($CO_2$) in some cases. The cathode 21 has a first surface facing the separator 30, and a second surface facing the $CO_2$ gas flow path 22.

The $CO_2$ gas flow path 22 is formed of a pit (groove portion/recessed portion) provided in a second flow path plate 24. It is preferable to use, for the second flow path plate 24 forming the $CO_2$ gas flow path 22, a material having low chemical reactivity and high conductivity. Examples of the material include metal materials such as Ti and SUS, carbon materials, and the like. The second flow path plate 24 is provided with not-illustrated gas introduction port and discharge port, and gas containing $CO_2$ (hereinafter, also described as $CO_2$ gas) is introduced and discharged by the gas supply system 200 via these introduction port and discharge port. The $CO_2$ gas flow path 22 will be described later in detail. The cathode current collector 23 is in electrical contact with a surface on a side opposite to the cathode 21 of the second flow path plate 24. Note that the first flow path plate 14 and the second flow path plate 24 are provided with screw holes for tightening and the like. Further, at the front and the rear of each of the flow path plates 14, 24, not-illustrated packing is sandwiched as needed.

Figure 3:
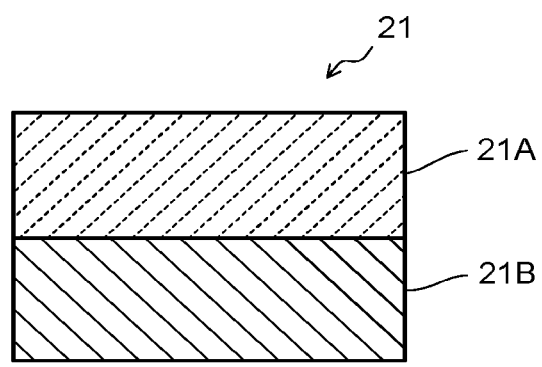
FIG. 3 is a view illustrating a cathode in the electrolysis cell illustrated in FIG. 2.

As illustrated in FIG. 3, the cathode 21 has a gas diffusion layer 21A and a cathode catalyst layer 21B. Between the gas diffusion layer 21A and the cathode catalyst layer 21B, a porous layer denser than the gas diffusion layer 21A may be disposed. The gas diffusion layer 21A is disposed on the $CO_2$ gas flow path 22 side, and the cathode catalyst layer 21B is disposed on the separator 30 side. The cathode catalyst layer 21B may enter the gas diffusion layer 21A. The cathode catalyst layer 21B preferably has catalyst nanoparticles, a catalyst nanostructure, or the like. The gas diffusion layer 21A is constituted of, for example, carbon paper, carbon cloth, or the like, and has been subjected to water repellent treatment. The cathode catalyst layer 21B is supplied with an electrolytic solution and ions from the anode 11 via the separator 30. In the gas diffusion layer 21A, the $CO_2$ gas is supplied from the $CO_2$ gas flow path 22, and a product obtained by the reduction reaction of the $CO_2$ gas is discharged. The reduction reaction of $CO_2$ occurs in the vicinity of the boundary between the gas diffusion layer 21A and the cathode catalyst layer 21B, and a gaseous product is discharged from the $CO_2$ gas flow path 22.

The cathode catalyst layer 21B is preferably constituted of a catalyst material (cathode catalyst material) capable of reducing $CO_2$ to produce a carbon compound and capable of reducing an overvoltage in the above reaction. Examples of the cathode catalyst material include metals such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), metal materials such as alloys and intermetallic compounds containing at least one of the above metals, carbon materials such as carbon (C), graphene, CNT (carbon nanotube), fullerene, and ketjen black, and metal complexes such as a Ru complex and a Re complex. The cathode catalyst layer 21B can employ various shapes such as a plate shape, a mesh shape, a wire shape, a particle shape, a porous shape, a thin film shape, and an island shape.

The separator 30 is constituted of an ion exchange membrane capable of making the ions and the electrolytic solution move between the anode 11 and the cathode 21, and capable of separating the anode part 10 from cathode part 20. Examples of the ion exchange membrane include Neosepta (registered trademark) manufactured by ASTOM Corporation, Selemion (registered trademark) and Aciplex (registered trademark) manufactured by ASAHI GLASS CO., LTD., Fumasep (registered trademark) and Fumapem (registered trademark) manufactured by Fumatech, Nafion (registered trademark) being a fluorine resin made by sulfonating and polymerizing tetrafluoroethylene manufactured by Du Pont, Lewabrane (registered trademark) manufactured by LANXESS, IONSEP (registered trademark) manufactured by IONTECH, Mustang (registered trademark) manufactured by PALL, Ralex (registered trademark) manufactured by Mega, Gore-Tex (registered trademark) manufactured by GORE-TEX and so on. However, other than the ion exchange membrane such as a glass filter, a porous polymeric membrane, a porous insulating material, or the like may be applied to the separator 30, as long as they are materials capable of making ions move between the anode 11 and the cathode 21.

For the anode solution as the electrolytic solution, a solution containing at least water ($H_2O$) is used. An examples of the solution containing $H_2O$ used as the anode solution is an aqueous solution containing an arbitrary electrolyte. Examples of the aqueous solution containing the electrolyte include an aqueous solution containing at least one selected from a hydroxide ion ($OH^-$), a hydrogen ion ($H^+$), a potassium ion ($K^+$), a sodium ion ($Na^+$), a lithium ion ($Li^+$), a chloride ion ($Cl^-$), a bromide ion ($Br^-$), an iodide ion ($I^-$), a nitrate ion ($NO_3^-$), a sulfate ion ($SO_4^{2-}$), a phosphate ion ($PO_4^{2-}$), a borate ion ($BO_3^{3-}$), a carbonate ion ($CO_3^{2-}$), and a hydrogen carbonate ion ($HCO_3^-$). In order to reduce an electrical resistance of the electrolytic solution, an alkaline solution in which an electrolyte such as a potassium hydroxide or a sodium hydroxide is dissolved in high concentration may be used as the anode solution.

To the anode solution flow path 12 of the anode part 10, the anode solution is supplied from the anode solution supply system 100. The anode solution supply system 100 is configured to circulate the anode solution so that the anode solution flows through the anode solution flow path 12. The anode solution supply system 100 has a pressure controller 101, an anode solution tank 102, a flow rate controller (pump) 103, a reference electrode 104, and a pressure gauge 105, and is configured to make the anode solution circulate through the anode solution flow path 12. The anode solution tank 102 is connected to a not-illustrated gas component collection unit which collects a gas component such as oxygen ($O_2$) contained in the circulating anode solution. The anode solution is introduced into the anode solution flow path 12 after its flow rate and pressure thereof are controlled in the pressure controller 101 and the flow rate controller 103.

To the $CO_2$ gas flow path 22, the $CO_2$ gas is supplied from the gas supply system 200. The gas supply system 200 has a $CO_2$ gas cylinder 201, a flow rate controller 202, and a pressure controller 203. The $CO_2$ gas is introduced into the $CO_2$ gas flow path 22 after its flow rate and pressure thereof are controlled. The gas supply system 200 is connected to the product collection system 300 which collects a product in the gas flowed through the $CO_2$ gas flow path 22. The product collection system 300 has a gas/liquid separation unit 301 and a product collection unit 302. A reduction product such as CO or $H_2$ contained in the gas flowed through the $CO_2$ gas flow path 22 is accumulated in the product collection unit 302 via the gas/liquid separation unit 301.

The anode solution circulates through the anode solution flow path 12 at a time of an electrolytic reaction operation as described above. At a time of a later-described refresh operation of the electrolysis cell 2, the anode solution is discharged to the waste solution collection system 500 so that the anode 11, the anode solution flow path 12, and the like are exposed from the anode solution. The waste solution collection system 500 has a waste solution collection tank 501 connected to the anode solution flow path 12. A waste solution of the anode solution is collected into the waste solution collection tank 501 by opening and closing not-illustrated valves. The opening and closing of the valves or the like is controlled collectively by the control system 400. The waste solution collection tank 501 also functions as a collection unit of a rinse solution supplied from the refresh material supply system 600. Further, a gaseous substance supplied from the refresh material supply system 600 and containing a part of a liquid substance, is also collected by the waste solution collection tank 501 as needed.

The refresh material supply system 600 includes a rinse solution supply system 610 and a gaseous substance supply system 620. Note that the gaseous substance supply system 620 can be omitted according to circumstances. The rinse solution supply system 610 has a rinse solution tank 611 which is a supply source of a rinse solution such as water and a flow rate controller (pump) 612 which controls a supply flow rate or the like of the rinse solution. Note that the configuration of the rinse solution supply system 610 is not limited to the above configuration, but may be a later-described configuration. The gaseous substance supply system 620 has a gas tank 621 which is a supply source of a gaseous substance such as air, carbon dioxide, oxygen, nitrogen, or argon, and a pressure controller 622 which controls a supply pressure of the gaseous substance. The rinse solution supply system 610 and the gaseous substance supply system 620 are connected to the $CO_2$ gas flow path 22 and the anode solution flow path 12 via pipes. The rinse solution and gaseous substance are supplied to each of the flow paths 22, 12 by opening and closing not-illustrated valves. The opening and closing of the valves or the like is controlled collectively by the control system 400.

A part of the reduction product accumulated in the product collection unit 302 is sent to a reduction performance detection unit 303. In the reduction performance detection unit 303, a production amount and a proportion of each product such as CO or $H_2$ in the reduction product, are detected. The detected production amount and proportion of each product are input into a data collector and controller 401 of the control system 400. Further, the data collector and controller 401 collects electrical data such as a cell voltage, a cell current, a cathode potential, and an anode potential, as part of cell outputs of the electrolysis cell 2. The data collector and controller 401 is electrically connected, via bi-directional signal lines whose illustration is partially omitted, to the pressure controller 101 and the flow rate controller 103 of the anode solution supply system 100, the flow rate controller 202 and the pressure controller 203 of the gas supply system 200, the flow rate controller 612 and the pressure controller 622 of the refresh material supply system 600, in addition to the reduction performance detection unit 303, and collectively control them. Note that each pipe is provided with a not-illustrated valve, and an opening/closing operation of the valve is also controlled by a signal from the data collector and controller 501.

Figure 4:
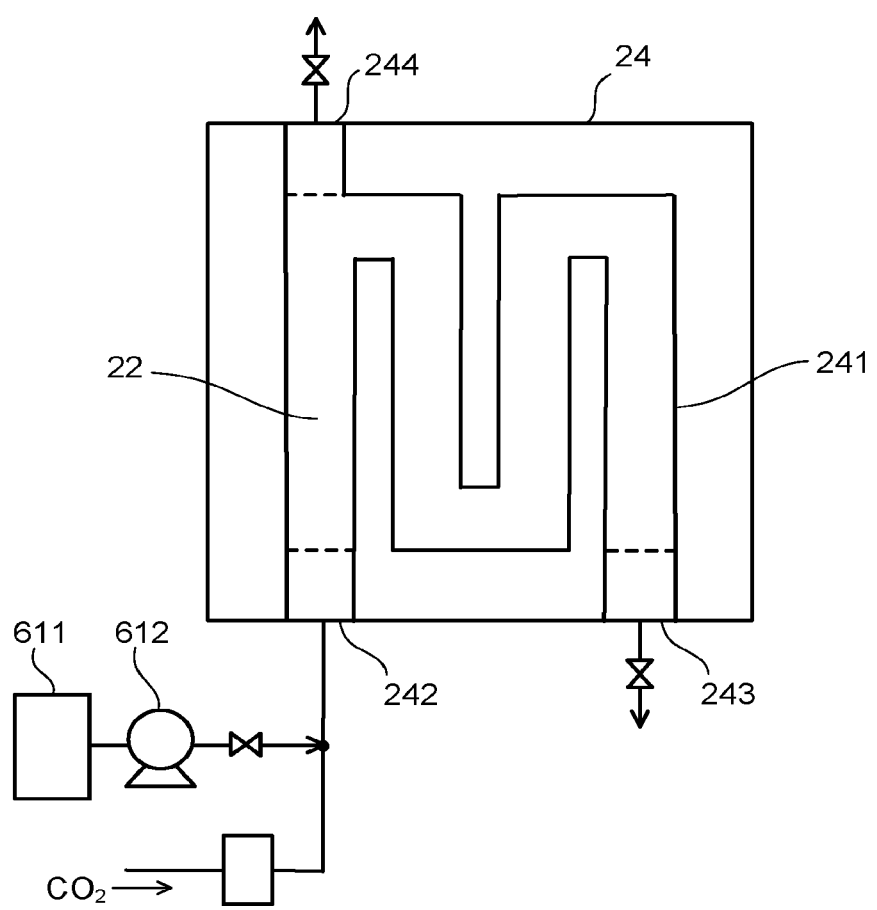
FIG. 4 is a plan view illustrating a $CO_2$ gas flow path in the electrolysis cell illustrated in FIG. 2.

The second flow path plate 24 of the electrolysis cell 2 is provided with the $CO_2$ gas flow path 22 as illustrated in FIG. 4. The $CO_2$ gas flow path 22 is constituted of a groove 241 provided in the second flow path plate 24, and meanders according to the shape of the groove 241. The $CO_2$ gas flow path 22 includes, for example, a first opening 242 being an inlet for the $CO_2$ gas and a second opening 243 being an outlet for the $CO_2$ gas. The first opening 242 is provided at one end portion of the $CO_2$ gas flow path 22 and the second opening 243 is provided at the other end portion of the $CO_2$ gas flow path 22. The $CO_2$ gas flow path 22 further includes a third opening 244 provided at a position between the first opening 242 and the second opening 243. To the first opening 242, the gas supply system 200 and the gaseous substance supply system 620 are connected. The second opening 243 is connected to the product collection system 300 and the waste solution collection system 500. The connection structure of the $CO_2$ gas flow path 22 and the supply operation of the $CO_2$ gas and the rinse solution to the $CO_2$ gas flow path 22 will be described later.

Figure 5:
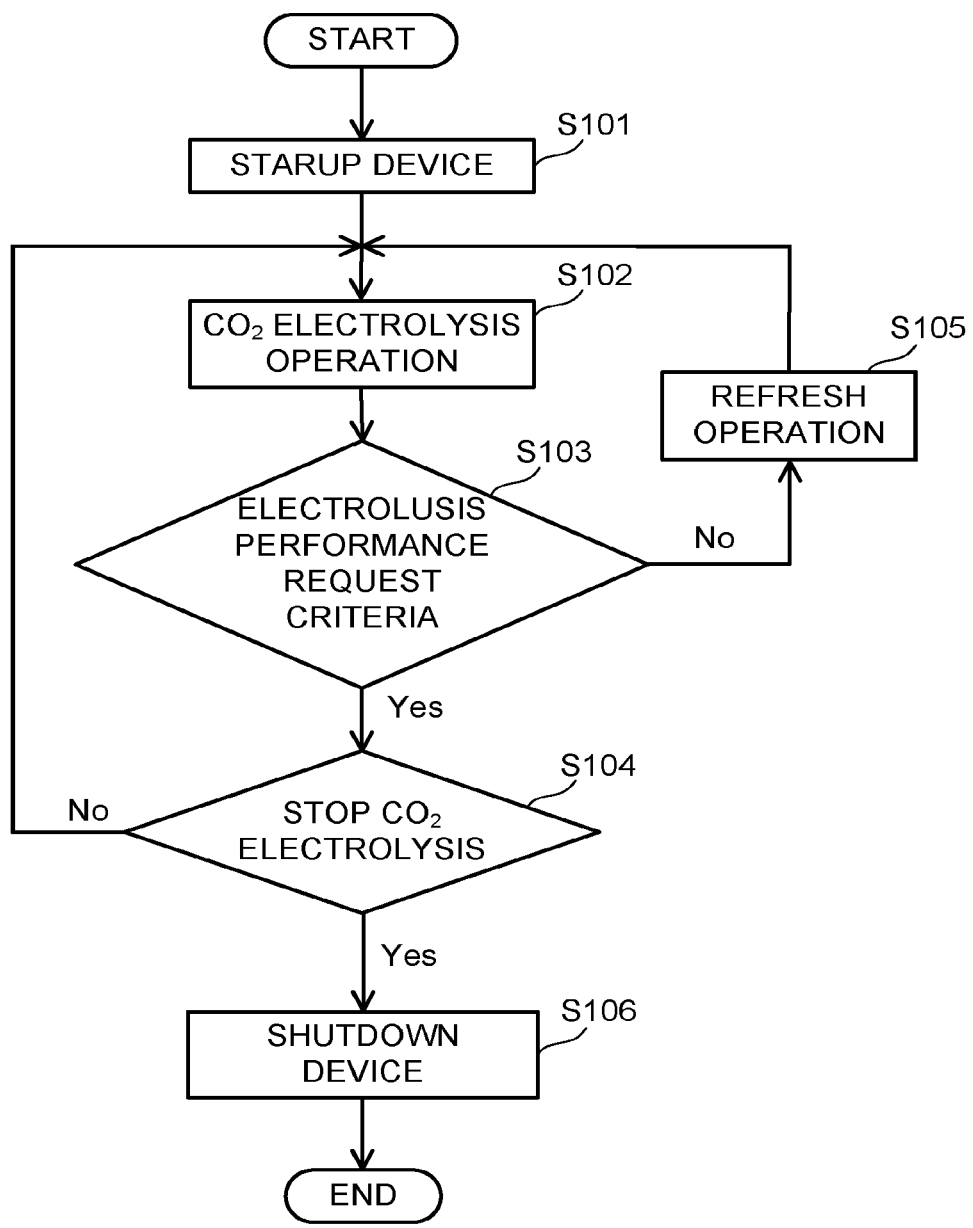
FIG. 5 is a chart illustrating an operation process of the carbon dioxide electrolytic device in the embodiment.

A working operation of the carbon dioxide electrolytic device 1 in the embodiment will be described. First, as illustrated in FIG. 5, a start-up step S101 of the electrolytic device 1 is performed. In the start-up step S101 of the electrolytic device 1, the following operation is performed. In the anode solution supply system 100, the anode solution is introduced into the anode solution flow path 12 after its flow rate and pressure are controlled by the pressure controller 101 and the flow rate controller 103. In the gas supply system 200, the $CO_2$ gas is introduced into the $CO_2$ gas flow path 22 after its flow rate and pressure are controlled by the flow rate controller 302 and the pressure controller 303.

Next, a $CO_2$ electrolysis operation step S102 is performed. In the $CO_2$ electrolysis operation step S102, output from the power supply 40 is started to the electrolytic device 1 which has been subjected to the start-up step S101, and a current is supplied by applying the voltage between the anode 11 and the cathode 21. When the current is made to flow between the anode 11 and the cathode 21, an oxidation reaction in the vicinity of the anode 11 and a reduction reaction in the vicinity of the cathode 21 occur, which will be described below. Here, a case of producing carbon monoxide (CO) as the carbon compound is mainly described, but the carbon compound as the reduction product of carbon dioxide is not limited to carbon monoxide and may be the above-described organic compounds such as $CH_4$, $C_2H_6$, $C_2H_4$, $CH_3OH$, $C_2H_5OH$, $C_2H_6O_2$ and the like.

When a current is supplied between the anode 11 and the cathode 21 from the power supply 40, an oxidation reaction of water ($H_2O$) occurs in the anode 11 in contact with the anode solution. As presented in following Formula (1), $H_2O$ contained in the anode solution is oxidized to produce oxygen ($O_2$) and hydrogen ions ($H^+$).

$$2H_2O \longrightarrow 4H^+ + O_2 + 4e^- \quad (1)$$

$H^+$ produced in the anode 11 moves in the anode solution existing in the anode 11, the separator 30, and the cathode solution in a cathode 21, and reaches the vicinity of the cathode 21. The reduction reaction of carbon dioxide ($CO_2$) occurs by electrons ($e^-$) based on the current supplied from the power supply 40 to the cathode 21 and $H^+$ moved to the vicinity of the cathode 21. As presented in following Formula (2), $CO_2$ supplied from the $CO_2$ gas flow path 22 to the cathode 21 is reduced to produce CO.

$$2CO_2 + 4H^+ + 4e^- \longrightarrow 2CO + 2H_2O \quad (2)$$

In the above-described reaction process in the cathode 21, the reduction reaction of $CO_2$ is considered to occur in the vicinity of the boundary between the gas diffusion layer 21A and the cathode catalyst layer 21B, as described above. In this event, the electrolytic solution (anode solution) which reaches the cathode 21 via the separator 30 enters up to the gas diffusion layer 21A or the cathode catalyst layer 21B has excess water, thus causing such a trouble that the production amount of CO produced by the reduction reaction of $CO_2$ reduces or the cell voltage increases. The reduction in the cell outputs of the electrolysis cell 2 as above is also caused by deviation of distribution of ions and residual gas in the vicinity of the anode 11 and the cathode 21, precipitation of an electrolyte in the cathode 21 and the anode 11, precipitation of an electrolyte in the anode solution flow path 12 and the cathode solution flow path 21, and the like. In order to detect the reduction in $CO_2$ electrolysis performance such as the cell outputs as above, a step S103 which determines whether or not the electrolysis performance satisfies the request criteria, is performed.

The data collector and controller 401 collects, for example, periodically or continuously the production amount and the proportion of each product and the cell outputs such as the cell voltage, the cell current, the cathode potential, the anode potential and the like as described above. Further, in the data collector and controller 401, the request criteria of the electrolysis performance are previously set, and determines whether or not the collected data satisfies the set request criteria. When the collected data satisfies the set request criteria, the $CO_2$ electrolysis operation S102 is continued without performing a $CO_2$ electrolysis stop (S104). When the collected data does not satisfy the set request criteria, a refresh operation step S105 is performed.

Examples of the request criteria of the cell outputs collected by the data collector and controller 401 include an upper limit value of a cell voltage when a constant current is made to flow through the electrolysis cell 2, a lower limit value of a cell current when a constant voltage is applied to the electrolysis cell 2, Faradaic efficiency of the carbon compound produced by the reduction reaction of $CO_2$ and the like. Here, the Faradaic efficiency is defined as a proportion of a current contributing to the production of an intended carbon compound with respect to a total current flowed through the electrolysis cell 2. In order to maintain the electrolysis efficiency, the refresh operation step S105 may be performed when the upper limit value of the cell voltage at a time of making the constant current flow reaches 150% or more, preferably 120% or more of a set value. Further, the refresh operation step S105 may be performed when the lower limit value of the cell current at a time of applying the constant voltage reaches 50% or less, preferably 80% or less of a set value. In order to maintain the production amount of the reduction product such as the carbon compound, the refresh operation step S105 may be performed when the Faradaic efficiency of the carbon compound becomes 50% or less, preferably 80% or less of a set value.

Regarding the determination of the cell outputs, for example, when at least one of the cell voltage, the cell current, the Faradaic efficiency of the carbon compound does not satisfy the request criterion, it is determined that the cell outputs do not satisfy the request criteria, and the refresh operation step S105 is performed. Further, it is also possible to set the request criteria of the cell outputs by combining two or more of the cell voltage, the cell current, and the Faradaic efficiency of the carbon compound The refresh operation step S105 may be performed, for example, when neither the cell voltage nor the Faradaic efficiency of the carbon compound satisfies the request criterion. The refresh operation step S105 is performed when at least one of the cell outputs does not satisfy the request criterion. In order to stably perform the $CO_2$ electrolysis operation step S102, the refresh operation step S105 is preferably performed at an interval of, for example, one hour or more.

Further, the operation of the electrolysis cell 2 causes precipitation of salt in the $CO_2$ gas flow path 22 and the gas diffusion layer 21A, thereby blocking the $CO_2$ gas flow path 22 or reducing the gas diffusibility, resulting in a reduction in output. This is because ions pass between the anode 11 and the cathode 21 via the separator 30, and the ions react with the gas component supplied to the electrolysis cell 2 and cause the precipitation of salt. For example, when a potassium hydroxide solution is used for the anode 11 and $CO_2$ is made to flow through the cathode 21, potassium ions move from the anode 11 to the cathode 21, and the ions react with $CO_2$ to produce a potassium hydrogen carbonate or a potassium carbonate. When they reach conditions equal to or less than the solubility, salt precipitates in the $CO_2$ gas flow path 22 and the gas diffusion layer 21A.

When the $CO_2$ gas flow path 22 is blocked, a uniform gas flow in the entire electrolysis cell 2 is hindered, also causing a reduction in output. In some cases, when the gas flow rate partially increases, the performance of the electrolysis cell 2 itself may improve. This is because an increase in gas pressure increases the gas component or the like supplied to the catalyst or increases the gas diffusibility to improve the cell performance in some cases. If the request criteria of the cell outputs are judged based on only one of the cell voltage, the cell current, and the Faradaic efficiency of the carbon compound, such a phenomenon may occur that salt precipitates in the $CO_2$ gas flow path 22 and the gas diffusion layer 21A to rapidly reduce the output even in a case where the cell performance improves or does not change. It is preferable, in the operating operation, to sense the reduction in output in advance and perform the refresh at an appropriate time, and it is also preferable, as the operating operation, to sense the precipitation of salt by the change in pressure of the $CO_2$ gas flow path 22 and perform the refresh in advance.

The judgment regarding the necessity of the refresh operation is preferably made based not only on the cell voltage, the current value, and the sensing of salt by the voltage change in the cell, but also on the gas/liquid separation performance between the anode 11 and the cathode 21 when the anode 11 and the cathode 21 are separated by the separator 30 of a porous body, namely, a movement amount of the liquid and gas between the anode 11 and the cathode 21, a gas amount of the product, a voltage difference relative to a reference electrode, an estimated value of the Faradaic efficiency from these parameter values, and the like. The calculation of the Faradaic efficiency from the parameter values and the necessity of the refresh can be comprehensively determined as the judgment of the necessity of the refresh also from later-described parameters, and any combination of the values and any calculation method are applicable.

The necessity of the refresh based on an estimated flooding degree may be judged from pieces of cell data, a voltage change, and the like by an operating method for detecting a flooding performance. Further, an operating time of the electrolysis cell 2 is taken into consideration in some cases. The operating time is not limited to an operating time after the operation is started, but may be an integrated value of the operating time so far, a duration, or an operating time after the refresh as described above. Further, it is also possible to use a calculated value of multiplication of the integrated voltage value by time, multiplication of the current value by time, or the like, and any combination and calculation method thereof can be applied. The calculated values of these combinations are preferable as compared to the judgment simply based on the duration or the like, since a difference depending on the operating method of the electrolysis cell 2 is also taken into consideration. Furthermore, it is also possible to use a variation value of the current or the voltage, a pH value and a change value of the electrolytic solution, and oxygen generation amount and variation amount.

It is preferable to perform the operation of judging the necessity of the refresh operation and make a judgment based on the parameter value such as a cell voltage or the like at a time of the operation, since the necessity of the refresh can be accurately judged although the working operation time is reduced. Note that a judgment operating time of the refresh in this event is preferably at least half or less of a refresh operation time, more preferably ¼ or less, and ideally ¹/₁₀ or less. Regarding the parameters for judging the necessity of the refresh, pieces of cell data are collected from many pieces of cell data via an electronic network, required parameters are derived by data collectors and data analyzers of a plurality of electrolysis cells 2, through big data analysis, machine learning or the like, the controller for the refresh operation is made to update the parameters for judging the necessity of refresh, thereby making it possible to constantly perform the best refresh. The necessity of the refresh operation can be judged by various methods.

Figure 6:
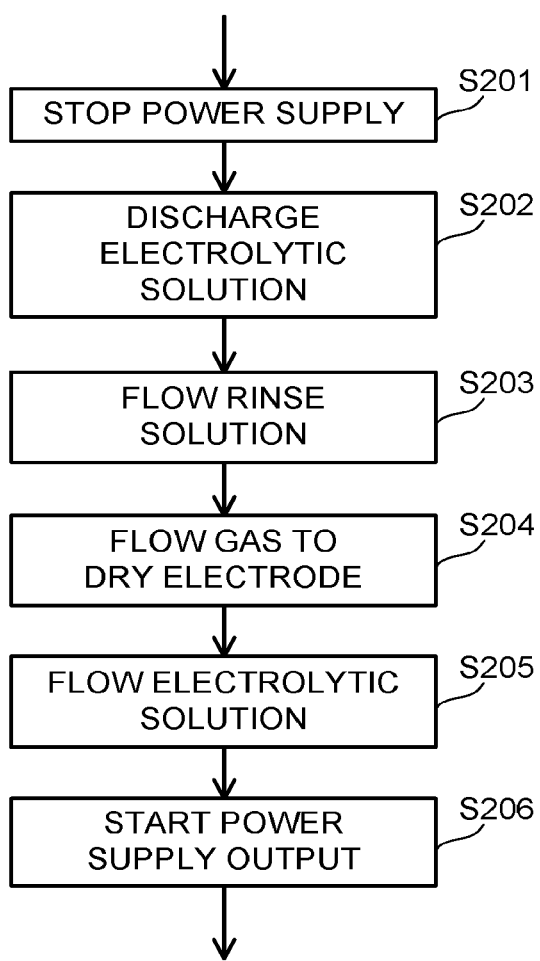
FIG. 6 is a chart illustrating a refresh process of the carbon dioxide electrolytic device in the embodiment.

The refresh operation step S105 is performed according to, for example, a flow chart illustrated in FIG. 6. First, the output of the power supply 40 is stopped (S201) to stop the reduction reaction of $CO_2$. Depending on the circumstances, the refresh operation may be performed while the output of the power supply 40 is continued. Next, the anode solution is discharged from the anode solution flow path 12 (S202). Next, the rinse solution is supplied to the $CO_2$ gas flow path 22 and the anode solution flow path 12 (S203), to thereby perform washing. It is preferable to apply a potential to the electrolysis cell 2 while the rinse solution flows. This is, as one aspect, a refresh operation for the catalyst and is performed for the purpose of treating the ions and impurities adhering to the catalyst. When an oxidation treatment is mainly performed, ions and impurities such as organic matters adhering to the surface of the catalyst can be oxidatively treated and removed. Further, performance of this operation in the rinse solution is effective because it is possible to perform not only the refresh of the catalyst but also the removal of ions substituted with an ion-exchange resin in the ion exchange membrane as the separator 30. A cyclic operation of repeating oxidation and reduction for the operation of the potential is preferable because the reproduction of the ion-exchange resin and the reproduction of the catalyst are accelerated. Further, depending on the circumstances, it is possible to apply the same potential at that in the normal operation to the electrolysis cell 2 to thereby perform refresh of the ion-exchange resin and the catalyst. It is not essential to change the potential. This case offers the advantage that the system and the apparatus are simplified.

When the rinse solution is made to flow through the anode part 10 and the cathode part 20, a saturation degree of water in the gas diffusion layer 21A increases, and output reduction occurs due to the diffusibility of gas. Therefore, gas is supplied to the $CO_2$ gas flow path 22 and the anode solution flow path 12 (S204) to lower the saturation degree of water, whereby the output is restored and the refresh effect is increased. The gas flow operation for refresh is preferably performed right after the flow of the rinse solution, and is preferably performed within at least five minutes. This is because the output reduction due to the increase in the saturation degree of water is large, and if it is assumed that the refresh is performed at intervals of, for example, an hour, the output during the refresh operation in five minutes is 0 V or significantly small, so that ⁵/₆₀ of the output is lost. From this viewpoint, it is preferable to make gas flow for a time as short as possible. When the above refresh operation is finished, the anode solution is supplied into the anode solution flow path 12, and $CO_2$ gas is introduced into the $CO_2$ gas flow path 22 (S205). Subsequently, the output of the power supply 40 is started according to the need (S206) to restart the $CO_2$ electrolysis operation. For the discharge of the anode solution from the anode solution flow path 12, gas may be used or the rinse solution may be used.

The supply and flow of the rinse solution (S203) are performed for the purpose of preventing precipitation of an electrolyte contained in the anode solution and washing of the cathode 21, the anode 11, and the flow paths 12, 21. To this end, as the rinse solution, water is preferable, water having an electric conductivity of 1 mS/m or less is more preferable, and water having an electric conductivity of 0.1 mS/m or less is furthermore preferable. In order to remove a precipitate such as the electrolyte in the cathode 21, the anode 11, and the like, an acid rinse solution such as sulfuric acid, nitric acid, hydrochloric acid, or the like having a low concentration may be supplied, and the acid rinse solution may be used to dissolve the electrolyte. In the case of using the acid rinse solution having a low concentration, a step of supplying the rinse solution of water is performed in a step thereafter. It is preferable to perform, right before the gas supply step, the supply step of the rinse solution of water, in order to prevent an additive contained in the rinse solution from remaining.

Further, for the refresh of the ion-exchange resin, it is preferable to use acid or alkaline rinse solution. This provides an effect of discharging substituted cations or anions in place of protons or $OH^-$ in the ion-exchange resin. For this reason, it is preferable that the acid and alkaline rinse solutions are made to flow alternately, the rinse solution is combined with water having an electric conductivity of 1 mS/m or less, and gas flow is supplied between flows of a plurality of rinse solutions so that the rinse solutions are not mixed.

The gas used for the gas flow step preferably contains one of air, carbon dioxide, oxygen, nitrogen, and argon. Gas having low chemical reactivity is preferable, air is more preferable, and nitrogen and argon are furthermore preferable. Further, gas produced by the reaction may be used to perform drying processing. For example, hydrogen gas may be produced by supplying gas containing no oxygen to the cathode 21 or stopping the supply of gas, and the produced hydrogen may be used to perform the refresh of drying the cathode 22. It is preferable that the refresh of the catalyst can be performed by using the reducing power of protons and hydrogen.

The precipitation of salt in the cathode part 20 is likely to occur on an upstream portion side of the $CO_2$ gas flow path 22. This is because the humidity of the flow path is low at the upstream portion of the flow path and the precipitation of salt is likely to occur. Further, because the gas in the flow path is humidified at the downstream portion of the flow path by the water from the anode 11 and the water generated by the reaction, the precipitation amount of salt tends to be small. It is conceivable that liquid water is generated depending on the circumstances and possibly dissolves and discharges the salt. Further, one of the conceivable reasons why the precipitation amount of salt is small is that the $CO_2$ amount in gas is reduced at the downstream portion of the flow path because the $CO_2$ gas reacts at the upstream portion.

In the $CO_2$ gas flow path 22 exhibiting the above state, if the rinse solution is supplied from the first opening 242 to the second opening 243 illustrated in FIG. 4, not the salt dissolution and removal effect cannot be sufficiently obtained at the downstream portion of the flow path but only flooding of the cathode 21 by the rinse solution is caused.

Hence, the third opening 244 is provided between the first opening 242 and the second opening 243 on the $CO_2$ gas flow path 22 as illustrated in FIG. 4 in the first embodiment. Regarding the supply of the rinse solution, the rinse solution is made to flow through the flow path between the first opening 242 and the third opening 244 corresponding to the upstream portion of the flow path, and the rinse solution is discharged from the third opening 244. This makes it possible to cause the rinse solution to flow through only a portion where the salt is likely to precipitate. By causing the eluate having dissolved the salt to flow through a part of the $CO_2$ gas flow path 22, the normal reaction can be continued at the latter half portion of the $CO_2$ gas flow path 22. By evaporating the rinse solution in the flow path and causing it to mix with the $CO_2$ gas and pass through the flow path, the refresh can be performed while the reaction is continued.

By supplying the rinse solution to the $CO_2$ gas flow path 22, the moisture amount in the gas diffusion layer 21A and the catalyst layer 21B of the cathode 21 increases to make $CO_2$ required for the reaction less likely to be supplied to the catalyst, thereby causing a phenomenon of decreasing the efficiency of the reaction. An increase in voltage of the reaction, a decrease in reaction density, and a decrease in reaction selectivity mainly occur. At the latter half of the flow path, a phenomenon of increasing the moisture amount due to the moving water from the anode 11 and the water generated by the reaction as described above becomes significant. Therefore, the rinse solution is supplied only to a part of the upstream portion of the $CO_2$ gas flow path 22 to perform the refresh operation, thereby making it possible to discharge the salt while preventing a decrease in performance of the electrolysis cell 2. It is preferable that the position of the third opening 244 is provided in a range of ⅓ or less from the first opening 242 with respect to the flow path length from the first opening 242 to the second opening 243. Further, since water is supplied only to a part of the flow path, the decrease in performance in the case of continuing the reaction during the refresh can be prevented. Further, the moisture amount increases due to the moving water from the anode 11 and the water generated by the reaction to decrease the cell performance at the latter half portion of the flow path, but the refresh is performed without supplying water to the portion, so that the cell performance can be maintained for a long time.

The water ($H_2O$) used as the rinse solution does not need to be liquid, but may be water vapor or gas containing water vapor. For the continuous reaction of the electrolysis cell 2, a mixture of $CO_2$ gas and water vapor is preferable, but liquid water is preferable from the viewpoint of the dissolution and discharge of salt. Further, even if the above-described refresh operation is performed, precipitation of salt may occur at the downstream portion of the $CO_2$ gas flow path 22 due to the operation for a long time. In such a case, a combination with the normal refresh operation of making the rinse solution to flow through the entire flow path or the downstream portion enables the elution of salt at the downstream portion, thus offering an effect of maintaining the performance of the electrolysis cell 2. Further, depending on the precipitation place of salt, the refresh section may be changed. To this end, a plurality of openings 244 at middle portions may be provided, and the section where the rinse solution is made to flow may be set according to the refresh section.

Second Embodiment

Next, a carbon dioxide electrolytic device according to a second embodiment will be described. The electrolytic device in the second embodiment is different from the electrolytic device 1 in the first embodiment, only in the connection structure to the electrolysis cell 2 of the $CO_2$ gas flow path 22, and is the same as the electrolytic device 1 in the first embodiment, in the other configuration. An essential part of the electrolytic device in the second embodiment will be described referring to FIG. 7.

Figure 7:
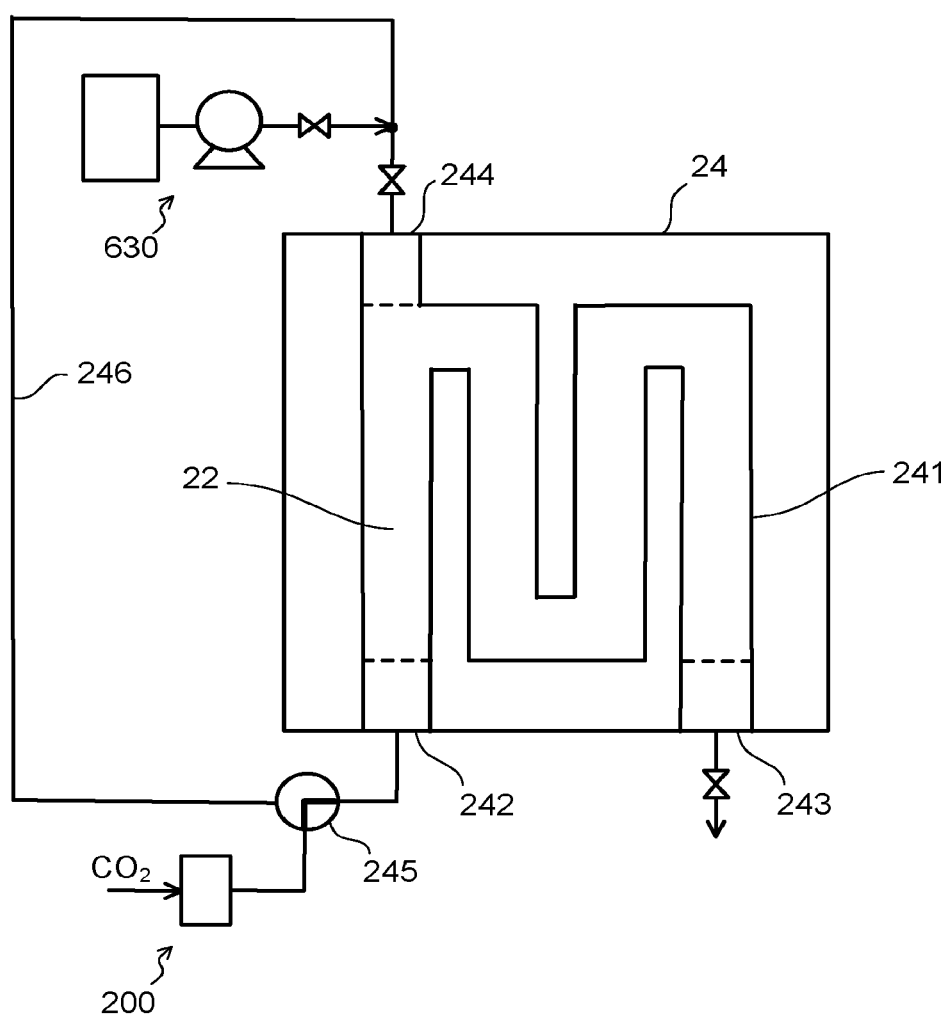
FIG. 7 is a plan view illustrating a $CO_2$ gas flow path in an electrolysis cell and its connection structure of a carbon dioxide electrolytic device in a second embodiment.

As illustrated in FIG. 7, in the electrolytic device in the second embodiment, to the $CO_2$ gas flow path 22, a rinse material supply system 630 is connected which introduces water (liquid) or gas containing water (liquid) or water vapor, as a rinse material to the third opening 244. The gas supply system 200 is connected to the first opening 242 of the $CO_2$ gas flow path 22 via a 2-position 3-port valve 245. The rinse material supply system 630 is further connected to the valve 245 via a pipe 246. In the $CO_2$ gas flow path 22 and the connection structure therefor, the refresh operation is performed as follows. The refresh operation may be performed with the operation of the electrolysis cell stopped, but the refresh operation is preferably performed while the electrolysis operation is being performed, from the viewpoint of efficiency.

The water (liquid) or the gas containing water (liquid) or water vapor as the rinse solution is made to flow back toward the upstream of the flow path from the third opening 244 provided halfway on the $CO_2$ gas flow path 22 and to flow through the $CO_2$ gas flow path 22 to thereby perform washing. In this event, when the $CO_2$ gas is made to flow toward the first opening 242 on the upstream side from halfway on the flow path (the third opening 244), the introduction amount of the rinse material can be reduced. By making the rinse solution to flow back in the above manner, the salt at a portion where its precipitation amount is large at the upstream portion of the flow path can be efficiently dissolved and discharged.

This is because when the dissolution of the salt is taken into consideration, if the rinse solution is made to flow from the upstream portion to the downstream portion, salt is eluted at the upstream portion and liquid high in slat concentration or the like needs to dissolve a small amount of salt. When the rinse solution or the like is made to flow from the downstream side on the flow path as in the second embodiment, liquid low in salt concentration dissolves a relatively large amount of salt at the upstream portion, and therefore can efficiently dissolve and discharge the salt. Therefore, even a small amount of the rinse solution or the like can offer the refresh effect, and the suppression of the moisture amount in the catalyst layer and the gas diffusion layer can maintain the output. The $CO_2$ gas usually made to flow from the upstream portion is switched by the valve 245 and one mass-flow controller is used, whereby the number of parts can be reduced without increasing the pipe length, resulting in preferably simplified apparatus.

Third Embodiment

Next, a carbon dioxide electrolytic device according to a third embodiment will be described. The electrolytic device in the third embodiment is different, from the electrolytic device 1 in the first embodiment, only in the connection structure to the $CO_2$ gas flow path 22 of the electrolysis cell 2 and the like, and is the same as the electrolytic device 1 in the first embodiment, in the other configuration. An essential part of the electrolytic device in the third embodiment will be described referring to FIG. 8.

Figure 8:
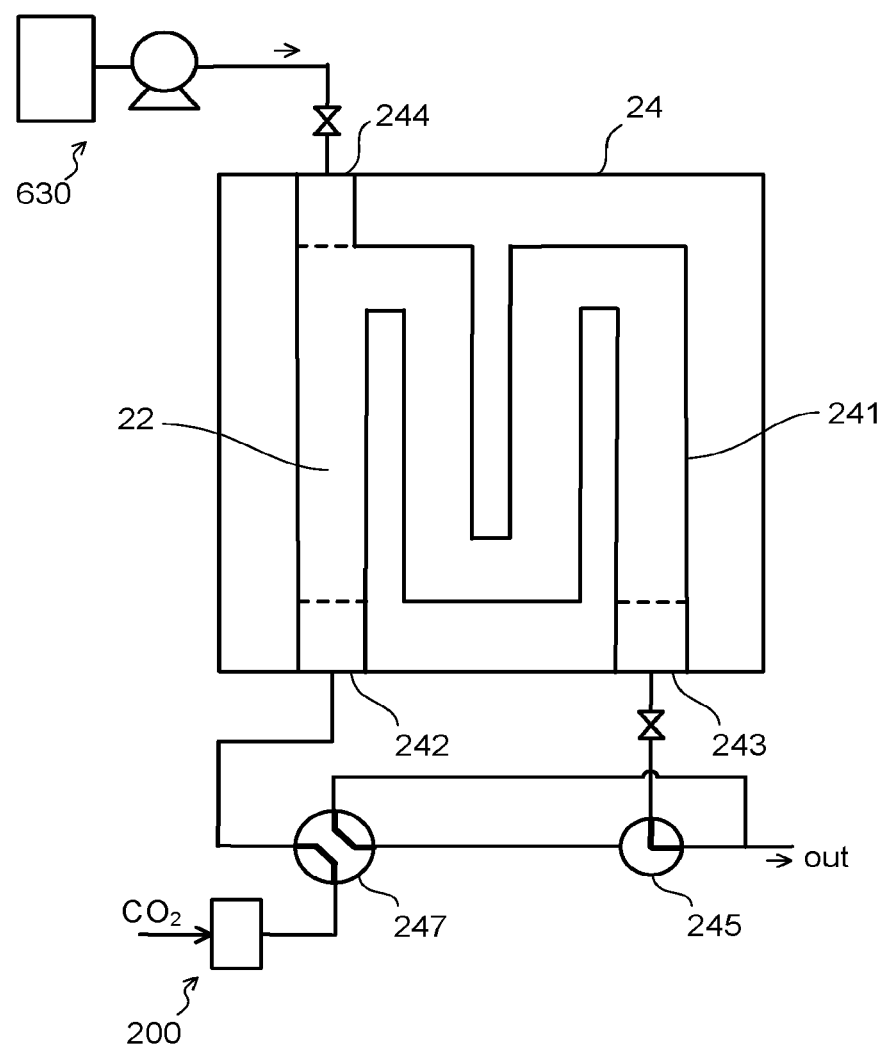
FIG. 8 is a plan view illustrating a $CO_2$ gas flow path in an electrolysis cell and its connection structure of a carbon dioxide electrolytic device in a third embodiment.

As illustrated in FIG. 8, in the electrolytic device in the third embodiment, the gas supply system 200 is connected to the first opening 242 of the $CO_2$ gas flow path 22 via a 2-position 4-port valve 247, and a 2-position 3-port valve 245 is connected to the second opening 243 of the $CO_2$ gas flow path 22. The valve 247 is connected to the valve 245. In the $CO_2$ gas flow path 22, the $CO_2$ gas flow direction is reversed by the valve 247 located between the gas supply system 200 and the $CO_2$ gas flow path 22, and the rinse material can be introduced from halfway on the flow path while making the $CO_2$ gas flow from the downstream side of the $CO_2$ gas flow path 22 toward the opening 24 at the upstream end portion. This operation enables the refresh operation while keeping the $CO_2$ gas flowing through the $CO_2$ gas flow path 22 at all times. Accordingly, it is possible to perform the refresh operation while keeping the electrolytic reaction of the electrolysis cell 2.

Fourth Embodiment

Next, a carbon dioxide electrolytic device according to a fourth embodiment will be described. The electrolytic device in the fourth embodiment is different, from the electrolytic device 1 in the first embodiment, only in the connection structure to the $CO_2$ gas flow path 22 of the electrolysis cell 2 and the like, and is the same as the electrolytic device 1 in the first embodiment, in the other configuration. An essential part of the electrolytic device in the fourth embodiment will be described referring to FIG. 9.

Figure 9:
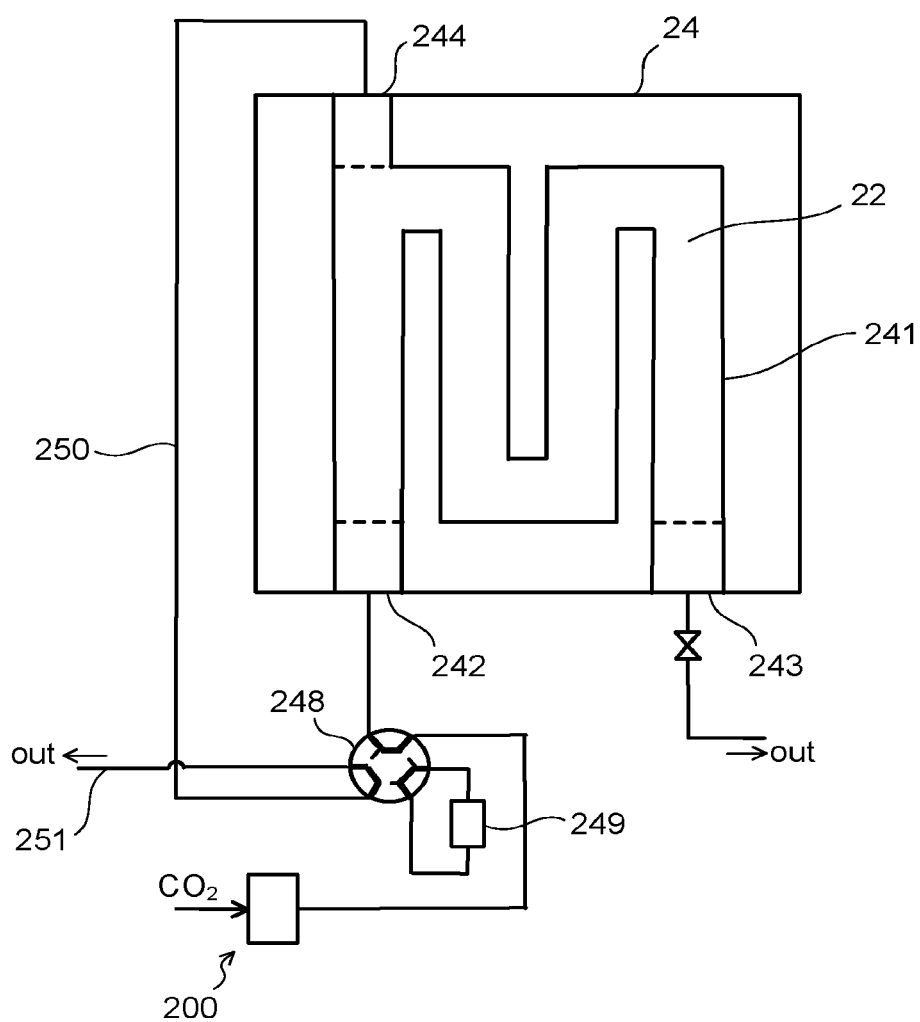
FIG. 9 is a plan view illustrating a $CO_2$ gas flow path in an electrolysis cell and its connection structure of a carbon dioxide electrolytic device in a fourth embodiment.

As illustrated in FIG. 9, in the electrolytic device in the fourth embodiment, the gas supply system 200 is connected to the first opening 242 of the $CO_2$ gas flow path 22 via a 2-position 6-port valve 248, and an auxiliary tank 249 which supplies a fixed amount of rinse material is connected to another port of the valve 248. Still another port of the valve 248 is connected to the third opening 244 via a pipe 250 and to a discharge pipe 251.

The input amount of the rinse material is a sufficient amount of water being equal to or less than twice the normal volume of the $CO_2$ gas flow path 22 or a vapor amount of an equivalent amount of substance of water, which can be said to be extremely small with respect to the volume. For example, when it is assumed that the electrolysis cell is a large-size cell of 100 mm square, and 2-parallel serpentine flow paths having a flow path structure in which 1-mm width flow paths are arranged at intervals of 1 mm is taken into consideration, there are 12.5 reciprocating flow paths. When refresh is tried to be performed from a place of one reciprocation from the upstream side, the volume in the flow path is approximately 1 mm×1 mm×100 mm×4 (paths) and is therefore about 4 cc. It is very difficult to quantitatively introduce such a small volume of fluid. It is very difficult to introduce the fluid in the form of liquid. For example, in the case of a diaphragm pump, even if defining it by the number of reciprocation times of the diaphragm, it is usually difficult to send the defined volume. Further, a plunger pump or a syringe pump are not preferable in terms of cost. Further, it is preferable to make water flow through the flow path in a short time in terms of dissolution of salt. It is desired to continuously send a fixed amount of water without separating the water. To this end, it is desired to prepare the fixed amount of water in the auxiliary tank 249 in advance, and send the water by gas such as $CO_2$ gas.

Therefore, the 2-position 6-port valve 248 is used as illustrated in FIG. 9 and can send the fixed amount of water by the valve 248. At the position of the valve 248 in FIG. 9, the $CO_2$ gas passes through the valve 248, and is introduced from the opening 242 on the upstream side of the $CO_2$ gas flow path 22 and discharged from the opening 243 on the downstream side after the reaction. Subsequently, when the valve 248 is switched as the refresh operation, the water accumulated in the auxiliary tank 249 in advance is pushed out by the $CO_2$ gas, whereby the fixed amount of water can be continuously sent without separation. It is possible to efficiently dissolve and discharge salt and efficiently perform the refresh operation by a simple system with a smaller number of parts.

Fifth Embodiment

Next, a carbon dioxide electrolytic device according to a fifth embodiment will be described. The electrolytic device in the fifth embodiment is different, from the electrolytic device 1 in the first embodiment, only in the structure of the $CO_2$ gas flow path 22 of the electrolysis cell 2 and a connection structure thereto and the like, and is the same as the electrolytic device 1 in the first embodiment, in the other configuration. An essential part of the electrolytic device in the fifth embodiment will be described referring to FIG. 10.

Figure 10:
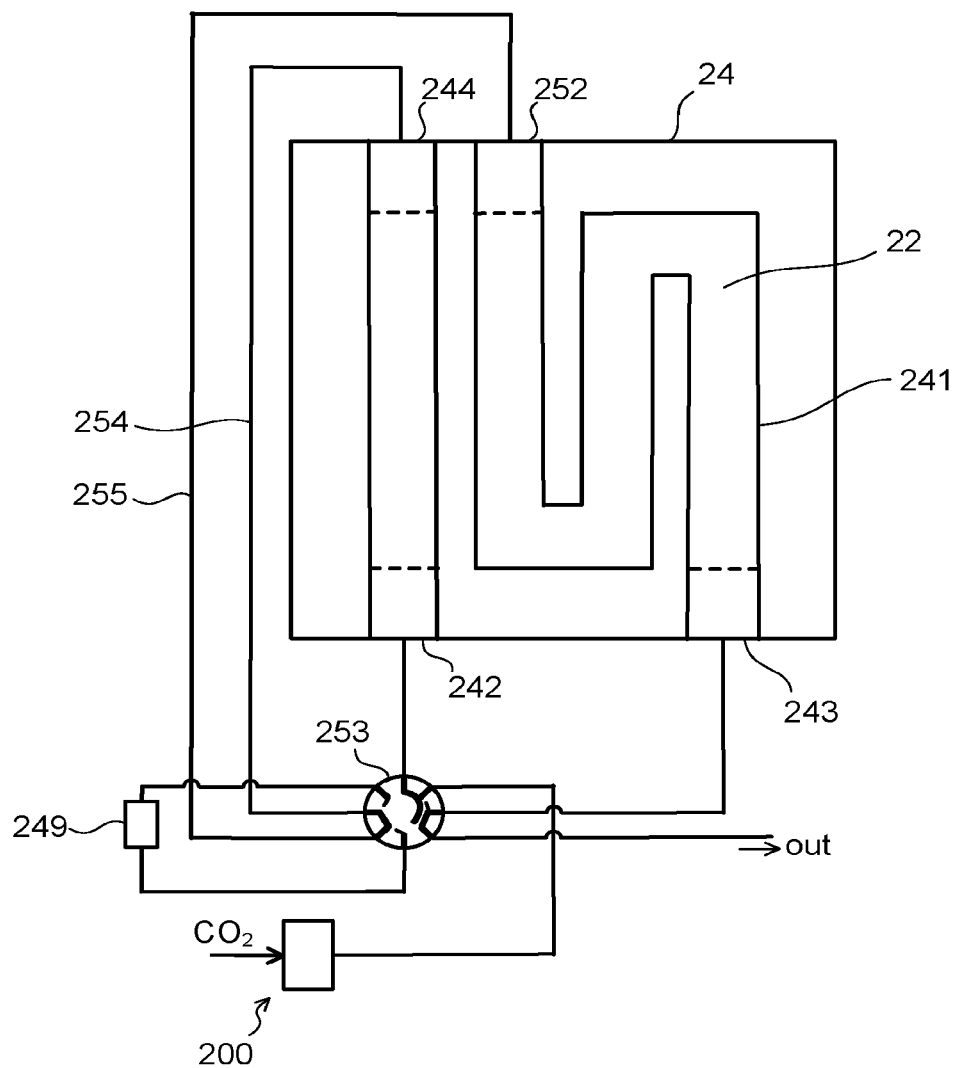
FIG. 10 is a plan view illustrating a $CO_2$ gas flow path in an electrolysis cell and its connection structure of a carbon dioxide electrolytic device in a fifth embodiment.

As illustrated in FIG. 10, in the electrolytic device in the fifth embodiment, the $CO_2$ gas flow path 22 further has a fourth opening 252. The first opening 242 is connected to the third opening 244 to form a first flow path. The fourth opening 252 is connected to the second opening 243 to form a second flow path. The first opening 242, the third opening 244, the fourth opening 252, the second opening 243, and an auxiliary tank 249 are connected to a 2-position 8-port valve 253, and the valve 253 is further connected to the gas supply system 200. By using the 2-position 8-port valve 253 as in FIG. 10, the advantages in the third embodiment and the fourth embodiment can be obtained by the one valve 253.

At a place where salt is likely to be generated at the upstream portion of the cell on the $CO_2$ gas flow path 22, the $CO_2$ gas is once discharged from the $CO_2$ gas flow path 22 via the pipe 254 and is made to pass through the valve 253, and then the $CO_2$ gas is returned to the $CO_2$ gas flow path 22 via the pipe 255. The $CO_2$ gas taken into/out of the electrolysis cell is made in advance to be able to be switched by the valve 253 to the flow path which supplies the fixed amount of water stored in the auxiliary tank 249. This $CO_2$ gas is finally discharged from a $CO_2$ discharge port (opening 243) of the $CO_2$ gas flow path 22. This discharged gas is also made in advance to be able to be switched via the valve 253 to the gas supply system 200.

At the position illustrated in FIG. 10, the $CO_2$ gas enters from the gas supply system 200 into the upstream side on the $CO_2$ gas flow path 22, and the $CO_2$ gas is connected once to the valve 253 by the pipe 254 from halfway on the $CO_2$ gas flow path 22 and returned to the $CO_2$ gas flow path 22 after passing through the valve 253. The returned gas passes through the $CO_2$ gas flow path 22 and is discharged from the $CO_2$ discharge port (opening 243).

On the other hand, at the refresh operation time, the $CO_2$ gas from the gas supply system 200 is switched by the valve 253 and flows back from the $CO_2$ discharge port (opening 243). The $CO_2$ gas flowing back in the $CO_2$ gas flow path 22 flows toward the valve 253 through the pipe 254 from halfway on the flow path. In turn, the valve 253 is switched, and the fixed amount of water stored in advance in the auxiliary tank 249 is sent by the $CO_2$ gas and returned again to the $CO_2$ gas flow path 22. The water and $CO_2$ gas returned to the $CO_2$ gas flow path 22 dissolve the salt at the upstream portion of the flow path and flow back to the $CO_2$ inflow port (opening 242), and the $CO_2$ gas is discharged together with the dissolved salt to the outside of the electrolysis cell. In this event, the inflow port and the discharge port of the $CO_2$ gas flow path 22 are switched over by the switching of the valve 253, so that the $CO_2$ gas after the reaction is discharged from the discharge port of the same valve 253.

As described above, the one valve can send the fixed amount of water toward the upstream from halfway on the $CO_2$ gas flow path 22 and make the $CO_2$ gas flow back from the $CO_2$ discharge port toward the $CO_2$ inflow port. By realizing the action, the refresh operation can be performed while maintaining the electrolytic reaction.

Sixth Embodiment

Next, a carbon dioxide electrolytic device according to a sixth embodiment will be described. The electrolytic device in the sixth embodiment is different, from the electrolytic device 1 in the first embodiment, only in the structure of the $CO_2$ gas flow path 22 of the electrolysis cell 2 and a connection structure thereto and the like, and is the same as the electrolytic device 1 in the first embodiment, in the other configuration. An essential part of the electrolytic device in the sixth embodiment will be described referring to FIG. 11.

Figure 11:
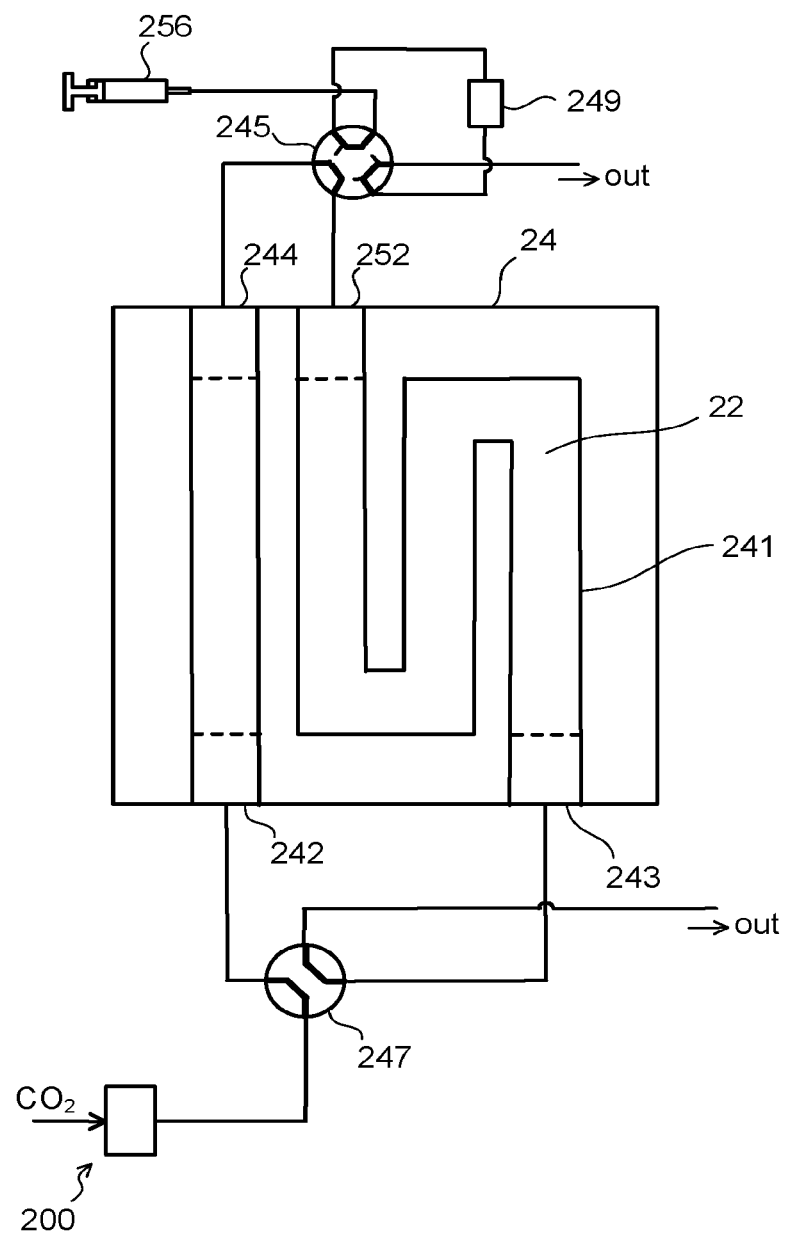
FIG. 11 is a plan view illustrating a $CO_2$ gas flow path in an electrolysis cell and its connection structure of a carbon dioxide electrolytic device in a sixth embodiment.

As illustrated in FIG. 11, in the electrolytic device in the sixth embodiment, the $CO_2$ gas flow path 22 further has a fourth opening 252. The first opening 242 is connected to the third opening 244 to form a first flow path. The fourth opening 252 is connected to the second opening 243 to form a second flow path. The gas supply system 200, the first opening 242, and the second opening 243 are connected to a 2-position 4-port valve 247. The third opening 244, the fourth opening 252, the auxiliary tank 249, and a water supply unit 256 like a cylinder are connected to the 2-position 6-port valve 248. By using the 2-position 6-port valve 248 and the 2-position 4-port valve 247 as illustrated in FIG. 11, the advantages in the third embodiment and the fourth embodiment can be obtained.

The valve 247 switches the gas supply system 200 and the inlet (242) and the outlet (243) of the $CO_2$ gas flow path 22, and makes a back-flow at the refresh time. On the other hand, the $CO_2$ gas normally passes through the valve 248 from halfway on the $CO_2$ gas flow path 22, and returns again to the $CO_2$ gas flow path 22. At the other four ports of the valve 248, the fixed amount of water is introduced from the water supply unit 256 like a cylinder, and the fixed amount of water passes through the valve 248 and is stored in the auxiliary tank 249. The inside of the auxiliary tank 249 is filled with water, and when there is excessive water, the water is discharged from the other port. At the refresh time, the water stored in the auxiliary tank 249 operating in synchronization with the valve 247 on the inlet side for the $CO_2$ gas is pushed out by the $CO_2$ gas from the $CO_2$ gas flow path 22, returned to the $CO_2$ gas flow path 22, and finally discharged from the inlet for the $CO_2$ gas at the normal time of the $CO_2$ gas flow path 22.

Seventh Embodiment

Next, a carbon dioxide electrolytic device according to a seventh embodiment will be described. The electrolytic device in the seventh embodiment is different, from the electrolytic device 1 in the first embodiment, only in the structure of the $CO_2$ gas flow path 22 of the electrolysis cell 2 and a connection structure thereto and the like, and is the same as the electrolytic device 1 in the first embodiment, in the other configuration. An essential part of the electrolytic device in the seventh embodiment will be described referring to FIG. 12.

Figure 12:
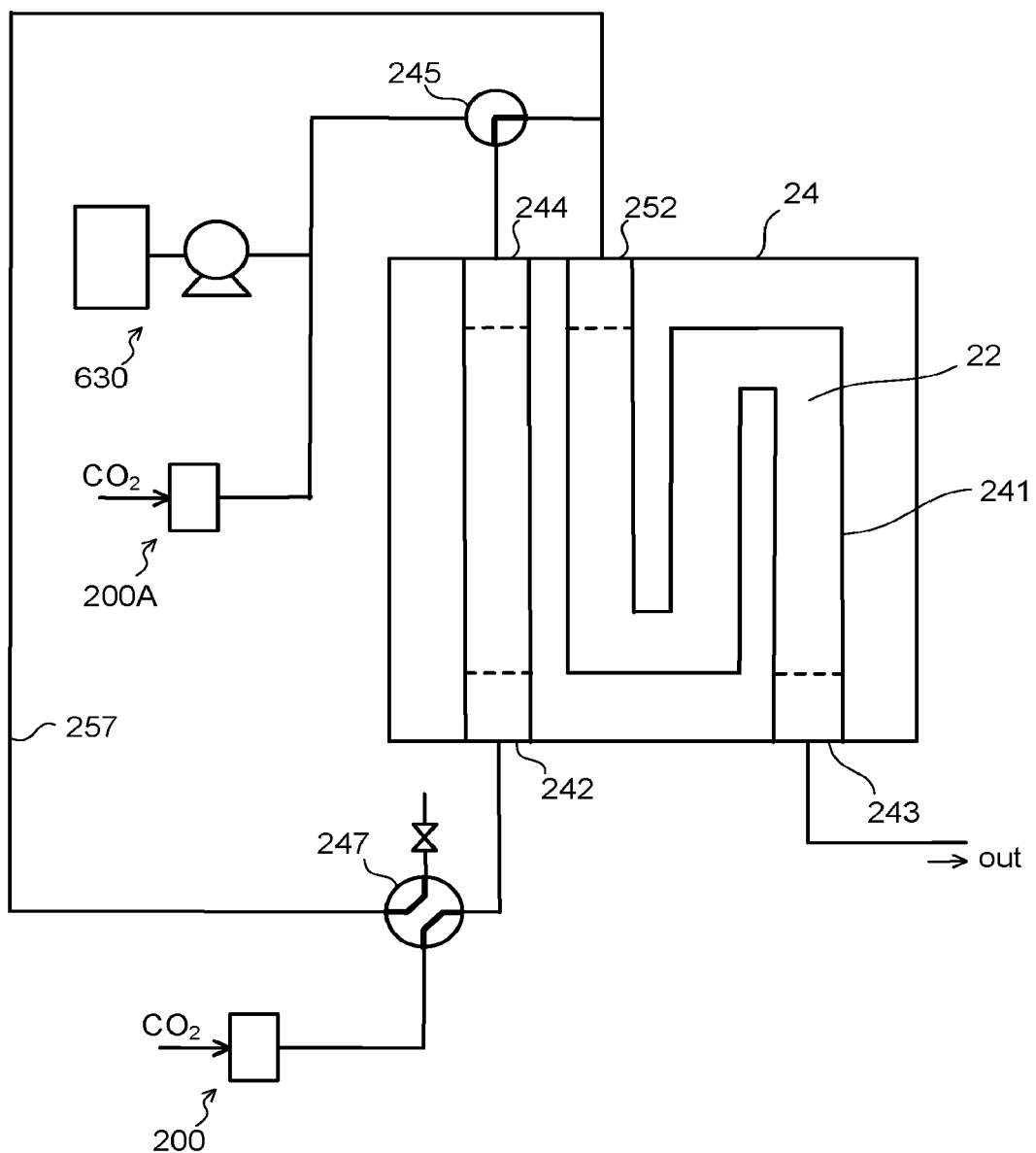
FIG. 12 is a plan view illustrating a $CO_2$ gas flow path in an electrolysis cell and its connection structure of a carbon dioxide electrolytic device in a seventh embodiment.

As illustrated in FIG. 12, in the electrolytic device in the seventh embodiment, the $CO_2$ gas flow path 22 further has a fourth opening 252. The first opening 242 is connected to the third opening 244 to form a first flow path. The fourth opening 252 is connected to the second opening 243 to form a second flow path. The gas supply system 200 is connected to the first opening 242 via a 2-position 4-port valve 247. The other port of the valve 247 is connected to the third opening 244 via a pipe 257 and via a 2-position 3-port valve 245 and connected to the fourth opening 252 via the pipe 257. To the other port of the valve 245, a second gas supply system 200A and a rinse material supply system 630 are connected. The second gas supply system 200A is arranged on the upstream side of the rinse material supply system 630.

As illustrated in FIG. 12, the gas supply system 200 is connected via the 2-position 4-port valve 247 to the inlet (opening 242) for the $CO_2$ gas and to a flow path inlet/outlet (opening 252) which is located halfway on the flow path and is at least the third or further counted from the upstream. Further, the second gas supply system 200A is connected via the 2-position 3-port valve 245 to a flow path inlet/outlet (opening 244) which is at least the second or further counted from the upstream. Between the second gas supply system 200A and the valve 245, the rinse material supply system 630 is provided.

At the normal reaction time, the $CO_2$ gas is introduced through the valve 247 to the flow path inlet (opening 242), returned to the third or further flow path inlet/outlet (opening 252) after flowing once through the valve 245 from the second or further flow path inlet/outlet (opening 244), and finally discharged from the flow path outlet (opening 243). At the refresh time, the $CO_2$ gas connected to the flow path inlet (opening 242) is switched by the valve 247 and introduced to the flow path inlet/outlet (opening 252) which is at least the third or further counted from the upstream, and flows toward the flow path outlet (opening 243). On the other hand, the other $CO_2$ gas introduction flow path is switched by the valve, and water is supplied between the second gas supply system 200A and the valve 245 by the rinse material supply system 630. The water is pushed out by the $CO_2$ gas, enters the flow path from the second or further flow path inlet/outlet (opening 242), and is then discharged from the flow path inlet.

Eighth Embodiment

Next, a carbon dioxide electrolytic device according to an eighth embodiment will be described. The electrolytic device in the eighth embodiment is different, from the electrolytic device 1 in the first embodiment, only in the structure of the $CO_2$ gas flow path 22 of the electrolysis cell 2 and a connection structure thereto and the like, and is the same as the electrolytic device 1 in the first embodiment, in the other configuration. An essential part of the electrolytic device in the eighth embodiment will be described referring to FIG. 13.

Figure 13:
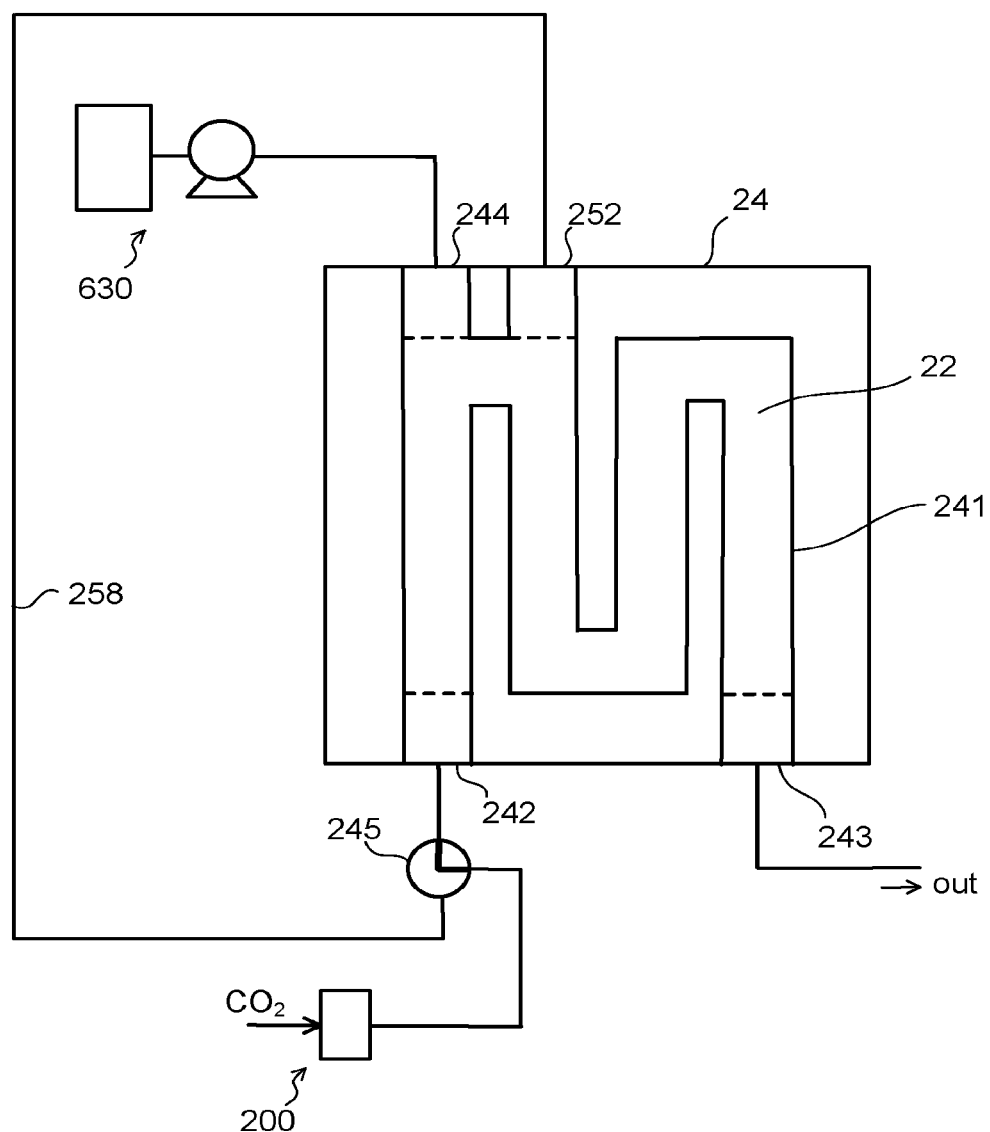
FIG. 13 is a plan view illustrating a $CO_2$ gas flow path in an electrolysis cell and its connection structure of a carbon dioxide electrolytic device in an eighth embodiment.

As illustrated in FIG. 13, in the electrolytic device in the eighth embodiment, the $CO_2$ gas flow path 22 further has a fourth opening 252 provided on the downstream side of the third opening 244. The gas supply system 200 is connected to the first opening 242 via a 2-position 3-port valve 245. The other port of the valve 245 is connected to the fourth opening 252 via a pipe 258. To the third opening 244, a rinse material supply system 630 is connected. As illustrated in FIG. 13, the flow path inlet (opening 242) via the valve 245 from the gas supply system 200 and a flow path inlet/outlet (opening 252) which is located halfway on the flow path and at least the third or further counted from the upstream and are connected. To the flow path inlet/outlet (opening 244) which is at least the second or further counted from the upstream, the rinse material supply system 630 is connected.

At the normal reaction time, the $CO_2$ gas is introduced from the flow path inlet (opening 242), and discharged from the flow path outlet (opening 243). On the other hand, at the refresh time, the $CO_2$ gas is switched by the valve 245 and is introduced from the inlet/outlet (opening 252) halfway on the flow path. In this event, water is introduced from the other inlet/outlet (opening 244) halfway on the flow path located between the inlet/outlet (opening 252) halfway on the flow path from which the $CO_2$ gas has been introduced and the flow path inlet (opening 242). The $CO_2$ gas introduced from the inlet/outlet (opening 252) halfway on the flow path flows toward both the flow path inlet (opening 242) and the flow path outlet (opening 243), and separately discharged. This configuration can simplify the flow regulator and the valves for the $CO_2$ gas and refresh only a minimum flow path portion while continuing the reaction.

EXAMPLES

Next, examples and evaluation results thereof will be described.

Example 1

The carbon dioxide electrolysis cell and the carbon dioxide electrolytic device illustrated in FIG. 1 and FIG. 2 were assembled, and the electrolysis performance of carbon dioxide was examined. For the electrolysis cell, a cathode was used in which carbon particles carrying gold nanoparticles were applied on carbon paper having a porous layer. The cathode was fabricated by the following procedure. First, a coating solution was produced by mixing the carbon particles carrying the gold nanoparticles, pure water, Nafion solution, and ethylene glycol. An average particle diameter of the gold nanoparticles was 8.7 nm, and a carried amount thereof was 18.9 mass %. The coating solution was filled in an air brush, and subjected to spray coating onto the carbon paper provided with the porous layer by using nitrogen gas. After the coating, the carbon paper was washed with flowing pure water for 30 minutes, and thereafter immerses in a hydrogen peroxide solution, whereby the organic matter such as ethylene glycol was oxidized and removed. This was cut into a size of 2×2 cm to be used as the cathode. Note that a coating amount of Au was estimated as about 0.2 $mg/cm^2$ based on a mixing amount of the gold nanoparticles and the carbon particles in the coating solution.

For the anode, an electrode in which $IrO_2$ nanoparticles to be a catalyst were applied to Ti mesh was used. As the anode, one made by cutting $IrO_2$/Ti mesh into 2×2 cm was used.

As illustrated in FIG. 2, the electrolysis cell 2 was produced in a manner that the cathode current collector 23, the $CO_2$ gas flow path 22 (third flow path plate 24), the cathode 21, the separator 30, the anode 11, and the anode solution flow path 12 (first flow path plate 14), and the anode current collector 13 were stacked in this order from the top, and the stack was sandwiched between not-illustrated support plates and tightened by the bolts. For the separator 30, an anion exchange membrane (product name: Selemion, manufactured by ASAHI GLASS CO., LTD.) was used. The $IrO_2$/Ti mesh of the anode 11 was brought into close contact with the anion exchange membrane. Note that an evaluation temperature was set to room temperature.

The electrolytic device 1 illustrated in FIG. 1 was assembled using the above-described electrolysis cell 2, and the electrolytic device was operated under the following condition. $CO_2$ gas was supplied to the $CO_2$ gas flow path of the electrolysis cell at 20 sccm, and an aqueous potassium hydroxide solution (concentration of 1 M KOH) was introduced into the anode solution flow path at a flow rate of 20 mL/min. Next, by using the power supply, a constant current of 600 mA (constant current density of 150 $mA/cm^2$) was made to flow between the anode and the cathode to cause an electrolytic reaction of $CO_2$, and a cell voltage at that time was measured and collected by the data collector and controller. Further, part of gas output from the $CO_2$ gas flow path was collected, and production amounts of CO gas produced by a reduction reaction of $CO_2$ and $H_2$ gas produced by a reduction reaction of water were analyzed by a gas chromatograph. In the data collector and controller, based on the gas production amounts, a partial current density of CO or $H_2$ and Faradaic efficiency being a ratio between the entire current density and the partial current density were calculated and collected. As the request criteria of the cell outputs of the refresh operation, a CO Faradaic efficiency was set to 50% or less, and the cell voltage when making the constant current flow was set to equal to or more than 3 V corresponding to 120% or more at the initial value of 2.5 V.

After 55 minutes from the start of the operation, a value of the CO Faradaic efficiency of 24% being 50% or less was detected, and therefore the refresh operation was carried out. Pure water was made to flow through the $CO_2$ gas flow path and the anode solution flow path of the electrolysis cell to wash the cathode, the $CO_2$ gas flow path, the anode, and the anode solution flow path. The flow of the rinse solution in the $CO_2$ gas flow path was set to the flow pass inlet (first opening) to the inlet/outlet (third opening) halfway on the flow path as described above. Then, air was made to flow through the $CO_2$ gas flow path and the anode solution flow path to dry them, and then the $CO_2$ gas and the anode solution were made to flow to thereby restart the $CO_2$ electrolytic reaction. Regarding the cell outputs after the refresh operation, the CO Faradaic efficiency became 84%, with which it was confirmed that the cell outputs were restored by the refresh operation.

Example 2

The carbon dioxide electrolysis cell and the carbon dioxide electrolytic device illustrated in FIG. 1 and FIG. 2 were assembled, and the electrolysis performance of carbon dioxide was examined. The anode and the cathode catalyst were produced as in Example 1. Next, the electrolysis cell was assembled as in Example 1. For the separator, a PTFE porous body (product name: POREFLON) subjected to a hydrophilic treatment was used. Note that an evaluation temperature was set to room temperature.

The solution system and the gas system were connected to the above-described electrolysis cell, and the operation was carried out under the following condition. $CO_2$ gas was made to flow through the $CO_2$ gas flow path at a flow rate of 60 sccm, and an aqueous potassium hydroxide solution (concentration of 1 M KOH) was made to flow through the anode solution flow path at a flow rate of 2 mL/min. Next, by using the power supply, a current at 2.2 V was made to flow between the anode and the cathode to cause an electrolytic reaction of $CO_2$. The cell voltage at that time was collected by the data collector and controller. The produced gas was analyzed by a gas chromatograph analyzer as in Example 1.

After 31 minutes from the start of the operation, the refresh operation was carried out. The refresh operation was carried out according to the structure in FIG. 9. The voltage of the cell was left as it was, and the refresh was carried out by making about 1 cc of distilled water flow through the gas flow path to discharge the liquid and dissolved salt, and then increasing the $CO_2$ gas flow rate to 200 ccm. The time of increasing the gas flow rate was about 30 seconds. The CO Faradaic efficiency was restored, with which it was confirmed that the cell outputs were restored by the refresh operation.

Example 3

In Example 3, a not-illustrated reference electrode was provided on the upstream on the anode flow path in the same cell as that in Example 2. For the reference electrode, Hg/HgO was used. In the refresh, distilled water was made to flow through the gas flow path, and when the flow path was filled with the liquid, the anode voltage was adjusted so that the cathode became 1.0 V with respect to the reference electrode, and the reaction was carried out for about one minute. After the reaction, the distilled water was stopped, and the $CO_2$ gas flow rate was increased to 200 ccm. The time of increasing the gas flow rate was about 30 seconds. The CO Faradaic efficiency was restored, with which it was confirmed that the cell outputs were restored by the refresh operation.

Note that the above-described configurations in the respective embodiments are applicable in combination, and parts thereof are also replaceable. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide electrolytic device, comprising:
an electrolysis cell comprising a cathode configured to reduce carbon dioxide to produce a carbon compound, an anode configured to oxidize water to produce oxygen, a gas supply flow path configured to supply carbon dioxide to the cathode and comprising at least a first opening provided on one end side, a second opening provided on another end side, and a third opening provided between the first opening and the second opening, a solution supply flow path configured to supply an electrolytic solution containing water to the anode, and a separator configured to separate the anode from the cathode;
a carbon dioxide supply unit configured to supply the carbon dioxide between the first opening and the second opening of the gas supply flow path;
an electrolytic solution supply unit configured to supply the electrolytic solution to the solution supply flow path; and
a rinse material supply unit configured to supply a rinse material containing $H_2O$ so as to make the rinse material flow at least between the first opening and the third opening of the gas supply flow path.

2. The device according to claim 1, wherein
the third opening is provided in a range of ⅓ or less from the first opening with respect to a flow path length from the first opening to the second opening.

3. The device according to claim 1, wherein
the rinse material supply unit is configured to make the rinse material to flow from the first opening toward the third opening.

4. The device according to claim 1, wherein
the rinse material supply unit is configured to make the rinse material to flow from the third opening toward the first opening.

5. The device according to claim 1, wherein
the rinse material supply unit is configured to supply water or water vapor as the rinse material containing $H_2O$.

6. The device according to claim 1, wherein
the gas supply flow path further comprises a multiport valve connected to at least one of the first opening, the second opening, and the third opening.

7. The device according to claim 6, wherein
the gas supply flow path is configured to adjust a supply direction of at least one of the carbon dioxide and the rinse material by the multiport valve.

8. The device according to claim 1, wherein
the gas supply flow path further comprises a first multiport valve connected to the first opening and the carbon dioxide supply unit, and the rinse material supply unit is connected to the third opening.

9. The device according to claim 8, wherein
the gas supply flow path further comprises a second multiport valve connected to the second opening and the first multiport valve.

10. The device according to claim 1, wherein
the gas supply flow path further comprises a multiport valve and the rinse material supply unit has a rinse material tank, and
the multiport valve is connected to the first opening, the third opening, the carbon dioxide supply unit, and the rinse material tank.

11. The device according to claim 1, wherein
the gas supply flow path further comprises a fourth opening, and has a first flow path between the first opening and the third opening and a second flow path between the fourth opening and the second opening, and
the gas supply flow path further comprises a first multiport valve connected to the first opening, the second opening, and the carbon dioxide supply unit.

12. The device according to claim 11, wherein
the rinse material supply unit has a rinse material tank connected to the first multiport valve, and the first multiport valve is connected to the third opening and the fourth opening.

13. The device according to claim 11, wherein
the gas supply flow path further comprises a second multiport valve connected to the third opening and the fourth opening, and the rinse material supply unit has a rinse material tank connected to the second multiport valve.

14. The device according to claim 1, wherein
the gas supply flow path further comprises a fourth opening, and has a first flow path between the first opening and the third opening and a second flow path between the fourth opening and the second opening, and the gas supply flow path further comprises a first multiport valve connected to the first opening and the carbon dioxide supply unit.

15. The device according to claim 14, wherein the gas supply flow path further comprises a second multiport valve connected to the third opening, the fourth opening, the first multiport valve, and the rinse material supply unit.

16. The device according to claim 14, wherein the first multiport valve is connected to the fourth opening, and the rinse material supply unit is connected to the third opening.

* * * * *